US011425022B1

(12) United States Patent
Singh et al.

(10) Patent No.: US 11,425,022 B1
(45) Date of Patent: Aug. 23, 2022

(54) SERVICE-BASED TUNNEL SELECTION SCHEME FOR MAPPING SERVICES TO TUNNELS

(71) Applicant: Juniper Networks, Inc., Sunnyvale, CA (US)

(72) Inventors: Ravi Singh, San Jose, CA (US); Yimin Shen, Shrewsbury, MA (US); Junan Chen, San Jose, CA (US); Shraddha Hegde, Bangalore (IN); Ahmed R. Darwish, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 141 days.

(21) Appl. No.: 16/779,426

(22) Filed: Jan. 31, 2020

Related U.S. Application Data

(63) Continuation-in-part of application No. 16/588,387, filed on Sep. 30, 2019, now Pat. No. 11,190,461.
(Continued)

(51) Int. Cl.
*H04L 45/00* (2022.01)
*H04L 45/02* (2022.01)
(Continued)

(52) U.S. Cl.
CPC .......... *H04L 45/04* (2013.01); *H04L 12/4633* (2013.01); *H04L 41/12* (2013.01); *H04L 61/251* (2013.01); *H04L 69/03* (2013.01)

(58) Field of Classification Search
None
See application file for complete search history.

(56) References Cited

U.S. PATENT DOCUMENTS 8,064,443 B2 11/2011 Scudder
2003/0177221 A1 9/2003 Ould-Brahim et al.
(Continued)

FOREIGN PATENT DOCUMENTS

CN 101616051 B 9/2011

OTHER PUBLICATIONS

Bashandy et al. "Segment Routing with the MPLS Data Plane" RFC 8660, Internet Engineering Task Force (IETF), Dec. 2019, 29 pp.
(Continued)

*Primary Examiner* — Ajit Patel
*Assistant Examiner* — Pamit Kaur
(74) *Attorney, Agent, or Firm* — Shumaker & Sieffert, P.A.

(57) ABSTRACT

Techniques are disclosed for service-based tunnel selection for forwarding network traffic. In one example, a network device obtains, based on service parameters associated with a network service, a service-specific tunnel selection scheme. The tunnel selection scheme identifies a primary mapping mode for mapping the network service to a primary transport tunnel and fallback mapping modes for mapping the network service to fallback transport tunnels. The primary mapping mode is categorized according to a first type comprising tunnel colorization, while the fallback mapping modes are categorized according to types other than tunnel colorization. In response to determining that the network service cannot be mapped to the primary transport tunnel according to the primary mapping mode, the network device, maps, based on the fallback mapping modes, the network service to the fallback transport tunnels. The network device forwards network traffic associated with the network service via the fallback transport tunnels.

18 Claims, 5 Drawing Sheets

USER INTERFACE 16
CONTROLLER 10
STORAGE DEVICE 12
TUNNEL MAPPING UNIT 14
2
NETWORK 8
SERVICE HOST DEVICE 22A
SERVICE HOST DEVICE 22B
SERVICE HOST DEVICE 22C
IFC 21A
IFC 21B
IFC 21C
FIRST NETWORK DEVICE 20
42A
42N
42B
44A
44N
44B
46A
46N
46B
SECOND NETWORK DEVICE 30
IFC 31A
IFC 31B
IFC 31C
CUSTOMER EDGE DEVICE 32A
CUSTOMER EDGE DEVICE 32B
CUSTOMER EDGE DEVICE 32C

Related U.S. Application Data

(60) Provisional application No. 62/955,293, filed on Dec. 30, 2019.

(51) Int. Cl.

| | |
|---|---|
| ***H04L 12/46*** | (2006.01) |
| ***H04L 69/00*** | (2022.01) |
| ***H04L 41/12*** | (2022.01) |
| ***H04L 61/251*** | (2022.01) |

(56) References Cited

U.S. PATENT DOCUMENTS

| | | | | |
|---|---|---|---|---|
| 2004/0044789 | A1* | 3/2004 | Angel | H04L 47/805 709/238 |
| 2009/0003200 | A1 | 1/2009 | So | |
| 2015/0146536 | A1 | 5/2015 | Minei et al. | |
| 2016/0337168 | A1 | 11/2016 | Rebella et al. | |
| 2017/0359247 | A1* | 12/2017 | Dixon | H04L 45/123 |
| 2018/0351882 | A1* | 12/2018 | Jeganathan | H04L 45/50 |
| 2019/0182155 | A1* | 6/2019 | Chang | H04L 61/251 |
| 2020/0153733 | A1* | 5/2020 | Chunduri | H04L 45/38 |

OTHER PUBLICATIONS

Filsfils et al. "Segment Routing Policy Architecture" draft-ietf-spring-segment-routing-policy-06.txt, SPRING Working Group, Internet-Draft, Dec. 14, 2019, 35 pp.

Filsfils et al. "Segment Routing Use Cases" draft-filsfils-spring-segment-routing-use-cases-01, Network Working Group, Internet-Draft, Oct. 21, 2014, 35 pp.

Patel et al. "The BGP Tunnel Encapsulation Attribute, draft-ietf-idr-tunnel-encaps-14," IDR Working Group, Internet Draft, Sep. 30, 2019, 42 pp.

Previdi et al., "Source Packet Routing in Networking (SPRING) Problem Statement and Requirements," RFC 7855, Internet Engineering Task Force (IETF), May 2016, 19 pp.

U.S. Appl. No. 16/868,919, filed May 7, 2020, naming inventor Ahmed R. Darwish.

U.S. Appl. No. 16/588,387, filed Sep. 30, 2019, naming inventors Singh et al.

Awduche et al., "RSVP-TE: Extensions to RSVP for LSP Tunnels," RFC 3209, Network Working Group, Dec. 2001, 61 pp.

Previdi et al., "Advertising Segment Routing Policies in BGP," draft-ietf-idr-segment-routing-te-policy-07, Network Working Group, Internet-Draft, Jul. 5, 2019, 41 pp.

"ASA Border Gateway Protocol Configuration Example" Document ID: 118050, Cisco, Aug. 11, 2014, available at https://www.cisco.com/c/en/us/support/docs/security/asa-5500-x-series-next-generation-firewalls/118050-config-pgp-00.html (last accessed Jan. 30, 2020) 23 pp.

"Color-Based Mapping of VPN Services Overview" Tech Library, Juniper Networks, Inc., Sep. 19, 2011, available at https://www.juniper.net/documentation/en_US/junos/topics/concept/color-based-mapping-of-vpn-services-overview.html (last accessed Jan. 30, 2020), 10 pp.

Shen et al. "BGP Flexible Color-Based Tunnel Selection" draft-shen-idr-flexible-color-tunnel-selection-00, Internet Engineering Task Force, Internet-Draft, Sep. 24, 2019, 12 pp.

"Example: Configuring a Routing Policy for Conditional Advertisement Enabling Conditional Installation of Prefixes in a Routing Table" TechLibrary, Juniper Networks, Inc. Aug. 20, 2019, available at https://www.juniper.net/documentation/en_US/junos/topics/example/conditional-prefix-installing-configuring.html (last accessed Jan. 30, 2020) 26 pp.

"Resolution-map" TechLibrary, Juniper Networks, Inc. Sep. 24, 2019, available at https://www.juniper.net/documentation/en_US/junos/topics/reference/configuration-statement/resolution-map-edit-policy-options.html (last accessed Jan. 30, 2020) 3 pp.

Mohapatra et al. "The BGP Encapsulation Subsequent Address Family Identifier (SAFI) and the BGP Tunnel Encapsulation Attribute" Network Working Group, RFC 5512, Apr. 2009, 13 pp.

Rekhter et al. "Carrying Label Information in BGP-4" Network Working Group, RFC 3107, May 2001, 8 pp.

Braden et al. "Resource Reservation Protocol (RSVP)—Version 1 Functional Specification," RFC 2205, Sep. 1997, 112 pp.

Patel et al. "The BGP Tunnel Encapsulation Attribute" draft-ietf-idr-tunnel-encaps-15.txt, IDR Working Group, Internet-Draft, Dec. 1, 2019, 26 pp.

Andersson et al. "LDP Specification" Network Working Group, RFC 5036, Oct. 2007, 135 pp.

Filsfils et al. "Segment Routing Architecture" Internet Engineering Task Force (IETF), RFC 8402, Jul. 2018, 32 pp.

Office Action from U.S. Appl. No. 16/868,919, dated Aug. 31, 2021, 30 pp.

Response to Office Action dated Aug. 31, 2021 from U.S. Appl. No. 16/868,919, filed Oct. 6, 2021, 14 pp.

Notice of Allowance from U.S. Appl. No. 16/868,919, dated Oct. 29, 2021, 10 pp.

* cited by examiner

SERVICE-BASED TUNNEL SELECTION SCHEME FOR MAPPING SERVICES TO TUNNELS

This application is a continuation-in-part of U.S. application Ser. No. 16/588,387, which was filed on Sep. 30, 2019. This application also claims the benefit of U.S. Provisional Application No. 62/955,293, which was filed on Dec. 30, 2019. The entire content of application Ser. No. 16/588,387 and 62/955,293 are incorporated herein by reference.

TECHNICAL FIELD

The disclosure relates to computer networks.

BACKGROUND

A computer network is a collection of interconnected computing devices that exchange data and share resources. In a packet-based network the computing devices communicate data by dividing the data into small blocks called packets. Certain device within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets allows the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may allow remotely located sources and receivers to share data. Network service providers provide services such as linking customer sites through a network core (VPN services) or subscribers to a service, security, tunneling, virtual private networks, filtering, load-balancing, VoIP/Multimedia processing and various types of application proxies (HTTP, XML, WAP, etc.) to incoming packets. Service providers also provide content-specific services designed to improve the quality of a user's experience, for example, video streaming and caching.

SUMMARY

In general, various aspects of the techniques enable a service-based tunnel selection scheme for mapping a network service to one or more transport tunnels for forwarding network traffic associated with the network service. A network device may receive packets via one or more ingress interface cards and forward packets via one or more egress interface cards, the one or more egress interface cards hosting a set of tunnels. The set of tunnels may, in some cases, connect the network device to another network device such that each tunnel of the set of tunnels leads from the network device to a common tunnel destination (as defined, for example, by a network address prefix that specifies a group of network addresses or, in some instances, a specific network address that identifies a host destination). Prior to forwarding network traffic for a network service over a tunnel of the set of tunnels, the network device resolves the availability of a tunnel that provides a quality of service or other parameter or type of service that a service provider has agreed to provide for a subscriber from which the packet was received. When a network device determines that a tunnel specified to carry the network traffic is not available, the network device may be unable to forward the network traffic to its destination and may instead drop the packet.

As set forth herein, techniques are disclosed that enable a network device to apply a flexible, service-based tunnel selection scheme such that the network device may forward network traffic associated with the network service to a destination via one or more fallback tunnels where a primary tunnel associated with a service is unavailable. In accordance with the techniques set forth herein, a network device may continue to forward network traffic associated with a network service to a destination even where a preferred transport tunnel for the network service is not available.

In one example of the techniques set forth herein, a network device obtains a service-specific tunnel selection scheme that corresponds to a service type of a network service. The tunnel selection scheme identifies, for the corresponding network service, a primary mapping mode for mapping the network service to a primary transport tunnel and at least one fallback mapping mode for mapping the network service to at least one fallback transport tunnel. The network device applies the service-specific tunnel selection scheme to map the network service to a reachable transport tunnel. For example, when the network device determines that a primary transport tunnel specified by the primary mapping mode is unavailable, the network device may map the network service to the at least one fallback tunnel of the at least one fallback mapping mode such that the network device may still forward the network traffic associated with the network service to a destination. In some examples, the primary mapping mode and one or more fallback mapping modes may be categorized according to different types, e.g., tunnel colorization, Interior Gateway Protocol (IGP), tunnel endpoint Internet Protocol (IP) address prefix, IP version 6 (IPv6) conversion of an IP version 4 (IPv4) tunnel endpoint address prefix, etc.

The techniques of the disclosure provide specific improvements to the computer-related field of computer networking that have practical applications. For example, the use of a service-specific tunnel selection scheme allows a network device to continue to forward network traffic for a network service even where a preferred transport tunnel of a preferred type is unavailable for use. Further, the use of a service-specific tunnel selection scheme as described herein allows one to preferentially rank one or more tunnels of various types and capabilities according to their suitability for a particular network service such that, when attempting to map the network service to a tunnel, a network device attempts to map the network service to a most-suitable tunnel of a most-suitable type for the service, followed by a second-most-suitable tunnel of a second-most suitable type for the service, and so on. Thus, a network device as described herein may apply a tunnel resolution and fallback scheme that is service-specific, rather than generic to the network, which may allow for more granular optimization of the network path for network traffic of each network service within the network, particularly, in some examples, when the primary or, in other words, first-most suitable tunnel is unavailable. Accordingly, the techniques set forth in the disclosure may improve the reliability (in view of the fallback scheme) and forwarding of network traffic associated with a network service, as well as reduce congestion of network traffic within the network.

In one example, this disclosure describes a method comprising: obtaining, by processing circuitry of a network device and based on one or more service parameters associated with a network service, a service-specific tunnel selection scheme that identifies: a primary mapping mode for mapping the network service to a primary transport tunnel of a plurality of transport tunnels having one or more tunnel parameters; and at least one fallback mapping mode for mapping the network service to at least one fallback transport tunnel of the plurality of transport tunnels; determining, by the processing circuitry, that the network service cannot be mapped to the primary transport tunnel according to the primary mapping mode identified by the service-specific tunnel selection scheme; in response to determining that the network service cannot be mapped to the primary transport tunnel according to the primary mapping mode, mapping, by the processing circuitry and based on the at least one fallback mapping mode identified by the service-specific tunnel selection scheme, the network service to the at least one fallback transport tunnel; and forwarding, by the processing circuitry, network traffic associated with the network service via the at least one fallback transport tunnel.

In another example, this disclosure describes a network device comprising processing circuitry operably coupled to a storage medium, the processing circuitry configured to: obtain, based on one or more service parameters associated with a network service, a service-specific tunnel selection scheme that identifies: a primary mapping mode for mapping the network service to a primary transport tunnel of a plurality of transport tunnels having one or more tunnel parameters; and at least one fallback mapping mode for mapping the network service to at least one fallback transport tunnel of the plurality of transport tunnels; determine that the network service cannot be mapped to the primary transport tunnel according to the primary mapping mode identified by the service-specific tunnel selection scheme; in response to determining that the network service cannot be mapped to the primary transport tunnel according to the primary mapping mode, map, based on the at least one fallback mapping mode identified by the service-specific tunnel selection scheme, the network service to the at least one fallback transport tunnel; and forward network traffic associated with the network service via the at least one fallback transport tunnel.

In another example, this disclosure describes a non-transitory, computer-readable medium comprising instructions that, when executed, are configured to cause processing circuitry of a network device to: obtain, based on one or more service parameters associated with a network service, a service-specific tunnel selection scheme that identifies: a primary mapping mode for mapping the network service to a primary transport tunnel of a plurality of transport tunnels having one or more tunnel parameters; and at least one fallback mapping mode for mapping the network service to at least one fallback transport tunnel of the plurality of transport tunnels; determine that the network service cannot be mapped to the primary transport tunnel according to the primary mapping mode identified by the service-specific tunnel selection scheme; in response to determining that the network service cannot be mapped to the primary transport tunnel according to the primary mapping mode, map, based on the at least one fallback mapping mode identified by the service-specific tunnel selection scheme, the network service to the at least one fallback transport tunnel; and forward network traffic associated with the network service via the at least one fallback transport tunnel.

The details of one or more examples of the techniques of this disclosure are set forth in the accompanying drawings and the description below. Other features, objects, and advantages of the techniques will be apparent from the description and drawings, and from the claims.

DETAILED DESCRIPTION

The entire contents of U.S. application Ser. No. 16/588,387, which was filed on Sep. 30, 2019, is incorporated herein by reference in its entirety.

Figure 1:
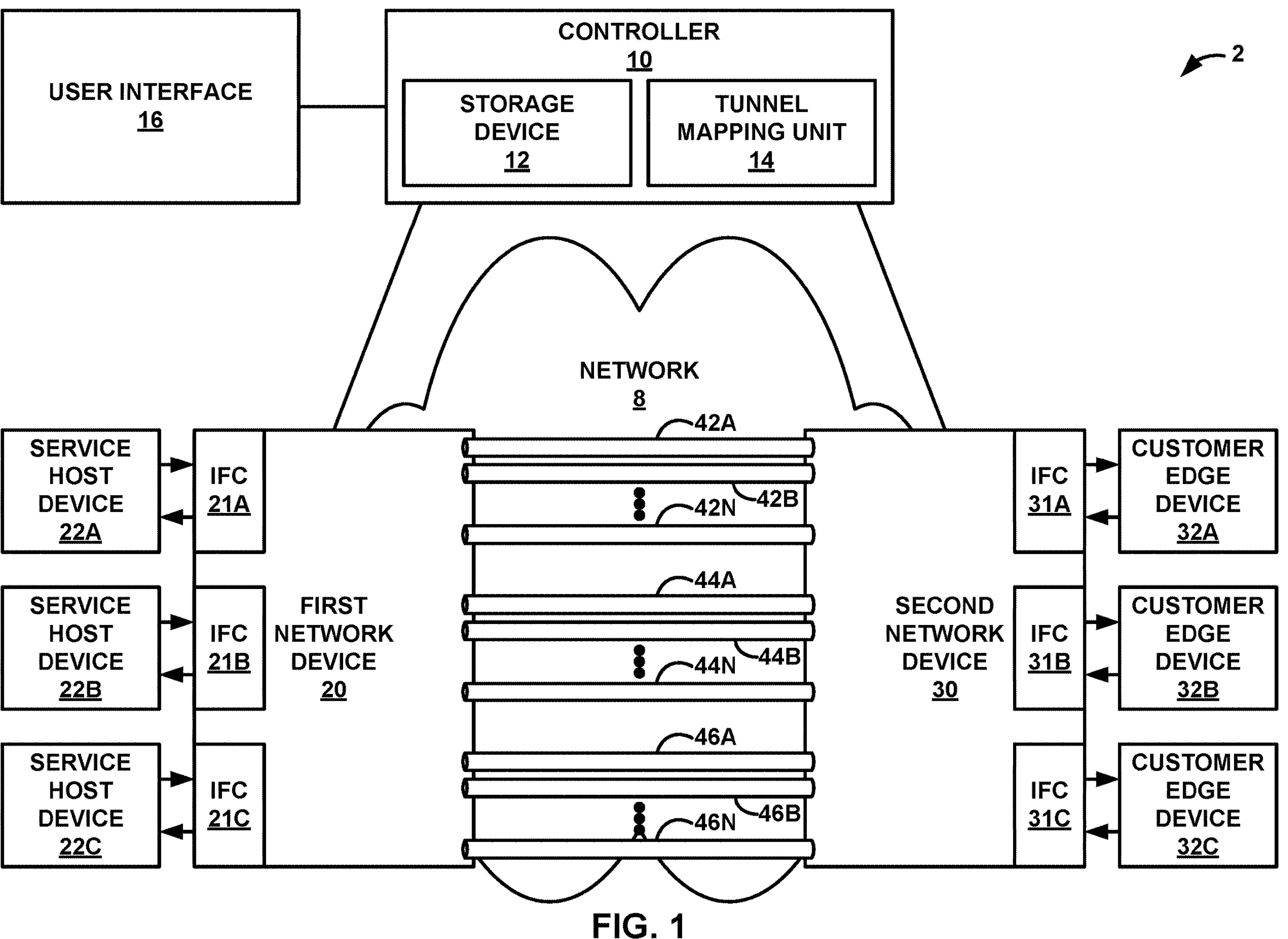
FIG. 1 is a block diagram illustrating a network system in which network traffic flows between a first network device and a second network device, in accordance with one or more techniques described herein.

FIG. 1 is a block diagram illustrating a network system 2 in which network traffic flows between a first network device 20 and a second network device 30, in accordance with one or more techniques described herein. As illustrated in FIG. 1, network system 2 includes controller 10, first network device 20, second network device 30, service host devices 22A-22C (collectively, "service host devices 22"), and customer edge (CE) devices 32A-32C (collectively, "CE devices 32") interconnected by a network 8. Network 8 offers packet-based connectivity to service host devices 22 and CE devices 32 attached to network 8 via first network device 20 and second network device 30 for accessing one or more services provided by service host devices 22. Network 8 may represent a public network that is owned and operated by a service provider to interconnect a plurality of networks. In some examples, network 8 may implement Multi-Protocol Label Switching (MPLS) forwarding and in such instances may be referred to as an MPLS network or MPLS backbone. In some instances, network 8 represents a plurality of interconnected autonomous systems, such as the Internet, that offers services from one or more service providers.

Network 8 includes, as shown in the example of FIG. 1, first network device 20 and second network device 30 (collectively, "network devices 20, 30"), controller 10, service host devices 22A-22C (collectively, "service host devices 22"), and customer edge devices 32A-32C (collectively, "customer edge devices 32"). First network device 20 may represent a provide edge (PE) network device, which may refer, as one example, to a router configured to interface with service host device 22 or other types of network devices, such as CE devices, in order to forward traffic via network 8. Second network device 20 may represent a Provider Edge (PE) network device, which again may refer to a router configured to interface with CE devices 32 or other types of network devices, such as service host devices, in order to forward network traffic via network 8.

Network devices 20, 30, in some cases, may each include a router such as a provider edge or customer edge router, a core router, or another type of network device, such as a switch. In this example, network devices 20, 30 each include a control unit (not illustrated in FIG. 1) that provides control plane functionality for the device. Additionally, network devices 20, 30 may each include one or more forwarding units (not illustrated in FIG. 1) that provide a data plane for processing network traffic.

First network device 20 and second network device 30 receive and send data packets via interfaces of interface cards 21A-21C ("IFCs 21") and via interfaces of interface cards 31A-31C ("IFCs 31"), respectively. Each of IFCs 21 and IFCs 31 (collectively, "IFCs 21, 31") may represent a separate line card insertable within a chassis (not shown) of network devices 20, 30. Example line cards include flexible programmable integrated circuit (PIC) concentrators (FPCs), dense port concentrators (DPCs), and modular port concentrators (MPCs). Each of IFCs 21, 31 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of network devices 20, 30 may include more or fewer IFCs.

Controller 10, in one example, may include one or more processors that are configured to implement functionality and/or process instructions for execution within network system 2. Controller 10 may include, for example, microprocessors, digital signal processors (DSPs), application specific integrated circuits (ASICs), field programmable gate array (FPGAs), or equivalent discrete or integrated logic circuitry, or a combination of any of the foregoing devices or circuitry. In the example illustrated in FIG. 1, controller 10 includes storage device 12 and tunnel mapping unit 14. As described in more detail below, controller 10, based on data from user interface 16, may be configured to generate a service-based tunnel selection scheme, where first network device 20 is configured to map one or more network services provided by service host devices 22 to one or more tunnels 42A-42N (collectively, "tunnels 42"), tunnels 44A-44N (collectively, "tunnels 44"), and tunnels 46A-46N (collectively, "tunnels 46") for transporting network traffic associated with the one or more network services to second network device 30.

Storage device 12 may be configured to store information within controller 10 during operation. Storage device 12 may include a computer-readable storage medium or computer-readable storage device. In some examples, storage device 12 includes one or more of a short-term memory or a long-term memory. Storage device 12 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage device 12 are used to store program instructions for execution by controller 10. Storage device 12 may be used by software or applications running on controller 10 to temporarily store information during program execution.

User interface 16 may be a device or set of devices for interacting with and/or managing interactions, input, and/or output with one or more service provider users. Accordingly, user interface 16 may include any now-known or hereinafter developed device for such interactions (e.g., keyboard, pointing device, microphone(s), touchscreen device(s), buttons, keypads, lights, microphone(s) and/or audio speaker(s) for voice commands, responses, and/or other interactions, display device(s), touchscreen device(s), or any combination thereof. If included within the user interface 16, a display may include any combination of a liquid crystal display (LCD), light-emitting diodes (LEDs), or organic light-emitting diodes (OLEDs). In some examples the display may include a touch screen or other physical or direct interaction device.

User interface 16 may be configured to display any information related to services, tunnels, first network device 20, second network device 30, or other information. The input may be, for example, in the form of pressing a button on a keypad or selecting an icon from a touch screen. In some examples, the input may include a selection of one or more tunnels for use with a primary mapping mode and one or more fallback mapping modes of a service-specific tunnel selection scheme. In these examples, controller 10 may, based on such input, generate a service-specific tunnel selection scheme that includes a primary mapping mode and at least one fallback mapping mode for use in mapping a corresponding network service to one or more transport tunnels, such as transport tunnels 42, 44, 46. As described in more detail below, in some examples, the primary mapping mode is categorized according to a first type, e.g., tunnel colorization, while the at least one fallback mapping modes are categorized according to a second type other than tunnel colorization. User interface 16 may, in some cases, be electrically coupled to controller 10. Alternatively, or in addition, user interface 16 may wirelessly communicate with controller 10. In some cases, user interface 16 and controller 10 may be integrated into a single unit having a single housing.

Service host devices 22 may represent servers, databases, or other types of network devices that facilitate delivery of services via network 8. Although referred to as a single device, each of service host devices 22 may represent an ecosystem of one or more devices configured to provide a service, such as Voice over Internet Protocol (VoIP), streaming video, data analysis or analytics (for various purposes, including malware detection, virus detection, data mining, cryptography, etc.), machine learning, security—including authentication, authorization, and accounting (AAA), network address translation (NAT), encryption, decryption, or any other type of service capable of being provided via network 8. CE devices 32 may represent switches, hubs, routers, computing devices (including smartphones, laptops, desktops, workstations, etc.), gaming systems, smart speakers, smart televisions, or any other type of network capable device that is able to interface with second network device 30.

Each of tunnels 42, tunnels 44, and tunnels 46 (collectively, "tunnels 42, 44, 46") may provide a network overlay between first network device 20 and second network device 30. Each of tunnels 42, 44, and 46 may traverse network 8 via one or more hops (which is one example way of referring to intervening network devices supporting network 8 that are not shown in the example of FIG. 1 for ease of illustration purposes). Each of tunnels 42, 44, and 46 may link the same pair of nodes (e.g., first network device 20 and second network device 30) such that a packet may travel between first network device 20 and second network device 30 via any one or more of tunnels 42, 44, and/or 46 in various different ways according to their respective characteristics. For example, each of the tunnels 42, 44, 46 may present different characteristics in terms of bandwidth, latency, high availability (or, in other words, operational time characteristics), etc. As such, different ones of tunnels 42, 44, and/or 46 may be more or less preferable for transporting network traffic associated with a particular network service than other tunnels 42, 44, and/or 46, although each of tunnels 42, 44, and/or 46 may be capable of transporting the network traffic associated with the network service to a destination (e.g., second network device 30).

Tunnels 42, 44, 46 may be signaled, for example, using any combination of Resource Reservation Protocol-Traffic Engineering (RSVP-TE), RSVP-TE auto-mesh, Label Distribution Protocol (LDP), Border Gateway Protocol (BGP)-Labeled Unicast (BGP-LU), BGP Segment Routing-Traffic Engineering (BGP SR-TE), Static Label-Switched Path (LSP), Static SR-TE, Open Shortest Path First/ISIS-Segment Routing (OSFP/ISIS-SR), SRv6, or dynamic IP protocols such as IP-in-IP, Generic Routing Encapsulation (GRE), Segment Routing over User Datagram Protocol (SR-o-UDP), MPLS over UDP (MPLS-o-UDP). Where a label switched path (LSP) is used for transport, the LSP may be referred to herein as a "tunnel." In a network such as network system 2 with data-traffic being sent over tunnels 42, 44, 46 between a pair of nodes such as first network device 20 and second network device 30, a subset of tunnels of tunnels 42, 44, 46 may be preferred for carrying network traffic. In some examples, a first set of tunnels that is more preferred for forwarding network traffic of a particular service than a second set of tunnels may be categorized according to a different type than the second set of tunnels (e.g., other than in terms of tunnel coloration type, etc.). In some cases, a set of tunnels may be preferred equally with a preferred volumetric split of network traffic between the tunnels of a particular type.

A packet received by first network device 20 may, in some cases, be associated with one or more services of a set of services provided by service host devices 22. In some examples, controller 10 may distribute to first network device 20 exterior gateway protocol messages that comprise a payload prefix specifying the one or more service parameters (e.g., a service color or service type) associated with one or more services associated with network traffic. Such exterior gateway protocol messages may be e.g., BGP UPDATE messages sent in accordance with BGP. In some examples, such network services may be signaled using BGP, such as Layer-3 Virtual Private Network (L3VPN), Ethernet Virtual Private Network (EVPN), Layer-2 Virtual Private Network (L2VPN), Family inet/inet6, BGP Virtual Private LAN Service (VPLS), or Next-Generation Multicast Virtual Private Network (NG-MVPN). In other examples, such network services may be signaled using LDP, such as LDP VPLS or LDP Virtual Private Wire Service (VPWS). In other examples, each packet forwarded and/or received by first network device 20 and second network device 30 (collectively, "network devices 20, 30") may include information which indicates one or more service colors that identify one or more services associated with the packet.

Services may correspond to one or more "service colors" and tunnels may correspond to one or more "tunnel colors." Colors, in some cases, are generic labels which identify a respective service or tunnel as being a part of a common type. For example, each tunnel that includes the color "blue" may be of a first type and each tunnel that includes the color "red" may be of a second type. As non-limiting examples, tunnels assigned to a particular color may have one or more characteristics in common, such as a similar latency, bandwidth, packet drop rate, address family (e.g., IPv4 or IPv6), software license agreement (SLA) requirements, quality requirement, tunneling protocol, path computation algorithm, virtual topology, virtual slice, etc. The use of "color" to group tunnels is referred to herein as "tunnel coloration."

Typically, network devices 20, 30 may prefer to map a service of a particular service color to one or more tunnels having a tunnel color that corresponds to the service color. With respect to the foregoing example, network devices 20, 30 may prefer to map a service having a service color corresponding to the color "blue" to one or more tunnels having a "blue" tunnel color, and a service having a service color corresponding to the color "red" to one or more tunnels having a "red" tunnel color. In some examples, a color is a 32-bit value. A tunnel route may comprise a tunnel color stored in RIB inetcolor.0 as <endpoint-color/64> or in RIB inet6color.0 as <endpointv6-color/160>. In some examples, a service color associates a service type with a protocol next hop.

In some examples, first network device 20 and second network device 30 may maintain, for any given flow, state information indicating a service color for each flow. As such, first network device 20 and second network device 30 may select the corresponding tunnel without inspecting each individual packet and instead reference the state information for the corresponding flow to identify the corresponding service color and select a tunnel color defined by the tunnel selection scheme. That is, the tunnel selection may, in some cases, be pre-determined solely based on the service route coloring without having to look at packet header or payload information distinguishing different packets by service type (for the same flow) which may otherwise (e.g., other than class of service—COS—marking) share the flow-identifying fields. In this respect, first network device 20 may only utilize the color-marking on the service routes and one or more tunnel specified by the tunnel selection scheme to select the tunnel (and without referencing any color marking in the packets).

In any event, controller 10 may assign one or more tunnel colors to each of tunnels 42, 44, 46. In some examples, controller 10 may not assign a color to one or more of tunnels 42, 44, 46. Such tunnels that are not assigned a color may be described herein as an "uncolored" tunnel. In some examples, network devices 20, 30 may receive, from controller 10, an exterior gateway protocol message that comprises a payload prefix specifying one or more attributes (e.g., tunnel color) associated with each of tunnels 42, 44, 46. Further, network devices 20, 30 may receive, from controller 10, an exterior gateway protocol message that comprises a payload prefix specifying one or more service parameters (e.g., a service color or service type) of a network service associated with a received packet. Such exterior gateway protocol messages may be e.g., BGP UPDATE messages sent in accordance with BGP. In this way, network devices 20, 30 may determine one or more of tunnels 42, 44, 46 in which to forward the packet based on the tunnel selection scheme and the one or more attributes (such as, e.g., tunnel color) associated with each of tunnels 42, 44, 46.

In some instances, first network device 20 maps a service associated with a particular service color to one or more tunnels associated with a tunnel color that corresponds to the service color. For example, first network device 20 may map a "red" service to one or more "red" tunnels 42, and forward network traffic associated with the "red" service along the one or more "red" tunnels 42 to a destination (e.g., a destination IP address prefix for the network traffic), such as second network device 30. However, if the one or more "red" tunnels 42 are unavailable, first network device 20 may be unable to map the "red" service to the one or more "red" tunnels 42 and therefore may be unable to forward the network traffic. In this situation, first network device 20 may drop the network traffic associated with the "red" network service. First network device 20 may drop such traffic even where an alternate route to the destination of the network traffic may otherwise be available.

For example, even if the one or more "red" tunnels 42 are unavailable, an alternate but less preferred route may still be available. Where one or more preferred (e.g., primary) tunnels 42 are unavailable but an alternate route (e.g., one or more fallback tunnels 44, 46) is available, it is more desirable for network deice 20 to forward the network traffic associated with the network service to its destination along an alternate route, even if such an alternate route is an undesirable path, than to allow network device 20 to simply drop the traffic.

In some examples, first network device 20 may be able to statically map a single backup tunnel for use by all tunnels without regard to the particular service associated with the network traffic. In other examples, first network device 20 may be able to statically map a single backup tunnel for use by another single tunnel. However, such a scheme is not robust because when both the primary tunnel and the single fallback tunnel are unavailable, first network device 20 may nevertheless be forced to drop the network traffic. Furthermore, because such a scheme does not consider the different types of network services transported by different primary tunnels, the single fallback tunnel may not be suitable as an alternate route for all network traffic of various different network services (e.g., where the single fallback tunnel does not meet various latency, bandwidth, or packet drop rate requirements, quality requirements, SLA requirements, etc. required by the network service).

The techniques of the disclosure enable network device 20 to implement a service-based tunnel selection scheme for mapping a network service to one or more transport tunnels in a less restrictive manner that allows for forwarding of network traffic associated with the network service. As set forth herein, network device 20 may forward network traffic associated with the network service to a destination via one or more fallback tunnels 44, 46 where a primary tunnel 42 associated with a service is unavailable. For example, network device 20 obtains, from controller 10, a service-specific tunnel selection scheme that corresponds to a service type of a network service provided by service host devices 22. In some examples, network device 20 receives, from controller 10, an exterior gateway protocol message specifying the tunnel selection scheme. Such exterior gateway protocol messages may be e.g., BGP UPDATE messages sent in accordance with BGP.

The tunnel selection scheme identifies, for the corresponding network service, a primary mapping mode for mapping the network service to a primary transport tunnel 42 and at least one fallback mapping mode for mapping the network service to one or more fallback transport tunnels 44 and 46. Network device 20 applies the service-specific tunnel selection scheme to map the network service to a reachable transport tunnel of tunnels 42, 44, 46. For example, when network device 20 determines that primary transport tunnel 42A specified by the primary mapping mode is unavailable, network device 20 may map the network service to the one or more fallback tunnels 44, 46 of the at least one fallback mapping mode such that network device 20 may still forward the network traffic associated with the network service to a destination (e.g. network device 30).

In some examples, the primary mapping mode and one or more fallback mapping modes may be categorized according to different types, e.g., tunnel colorization, IGP, tunnel endpoint IP address prefix, IPv6 conversion of an IPv4 tunnel endpoint address prefix (or vice versa), etc. For example network device 20 determines that a primary mapping mode specifies primary tunnels 42 by, e.g., color, and that primary tunnels 42 are unavailable. In response, network device 20 determines that a fallback mapping mode specifies fallback tunnels 44 by, e.g., tunnel endpoint IP address prefix, and maps the network service to one or more of fallback tunnels 44. Therefore, network device 20 may continue to forward network traffic associated with a network service to a destination (e.g., network device 30) even where a preferred transport tunnel (e.g., tunnels 42) for the network service is not available.

The techniques of the disclosure provide specific improvements to the computer-related field of computer networking that have practical applications. For example, the use of a service-specific tunnel selection scheme allows a network device, such as first network device 20, to continue to forward network traffic for a network service even where a preferred transport tunnel of a preferred type is unavailable for use. Further, the use of a service-specific tunnel selection scheme as described herein allows one to preferentially rank one or more tunnels of various types and capabilities according to their suitability for a particular network service such that, when attempting to map the network service to a tunnel, a network device attempts to map the network service to a most-suitable tunnel of a most-suitable type for the service, followed by a second-most-suitable tunnel of a second-most suitable type for the service, and so on.

Thus, a network device as described herein may apply a tunnel resolution and fallback scheme that is service-specific, rather than generic to the network, which may allow for more granular optimization of the network path for network traffic of each network service within the network. The tunnel resolution and fallback scheme described herein is more flexible to configure and accommodates changes in the availability of various tunnels because the tunnel resolution scheme described herein may be performed at any time, such as during the activation of first network device 20, the establishment of one or more tunnels 42, 44, 46, at a time of failure of one or more tunnels 42, 44, 46, or after configuration changes to components of network 8. Furthermore, the tunnel resolution and fallback scheme described herein may allow a user to specify desired tunnels of particular types for use by specific network services, while still allowing flexible fallback resolution to ensure that network traffic is not dropped even where a preferred tunnel is not available. Accordingly, the techniques set forth in the disclosure may improve the reliability and pathing of network traffic associated with a network service, as well as reduce congestion of network traffic within the network.

Figure 2:
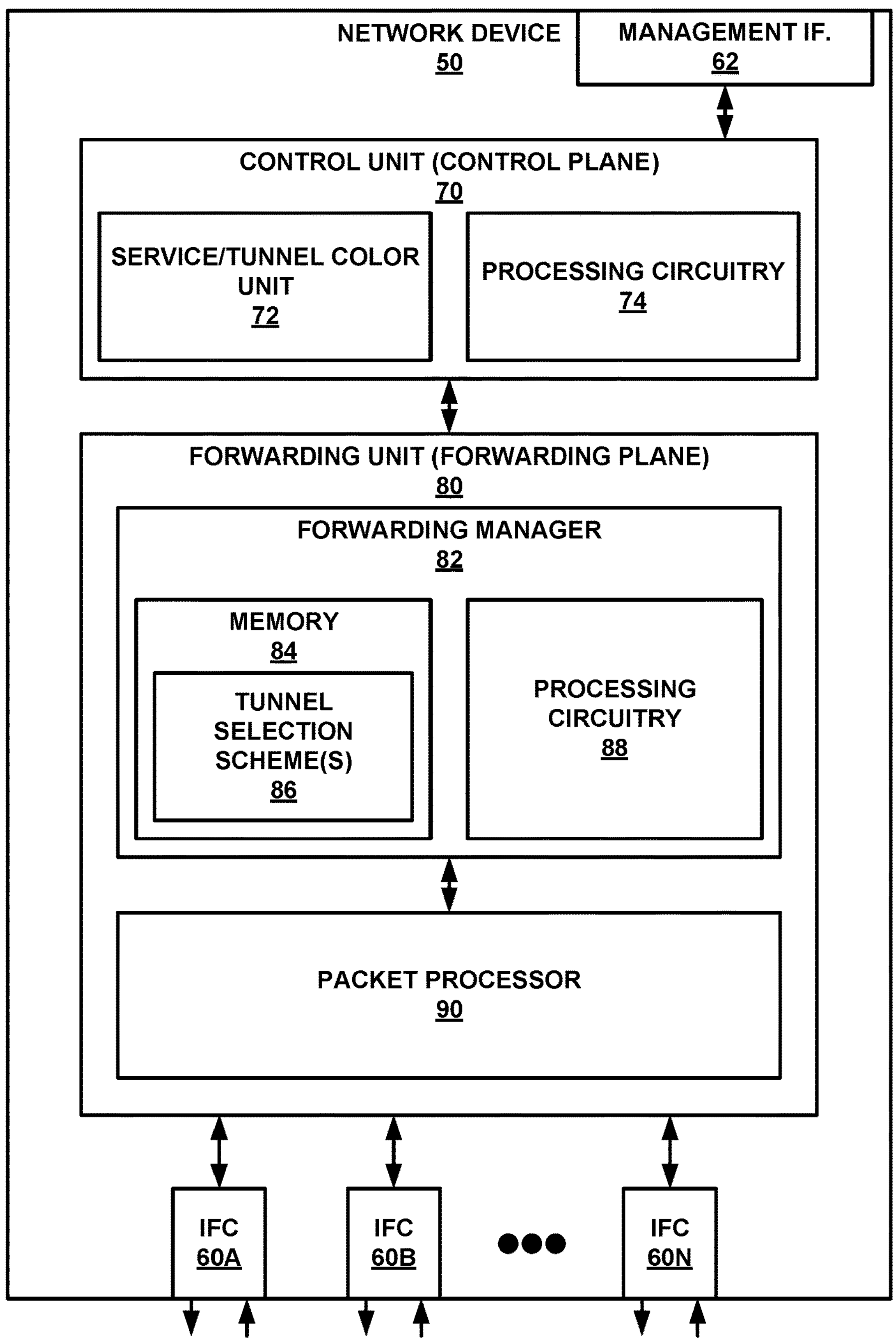
FIG. 2 is a block diagram illustrating an example of a network device, in accordance with one or more techniques of this disclosure.

FIG. 2 is a block diagram illustrating an example of a network device 50, in accordance with one or more techniques of this disclosure. As seen in FIG. 1, network device 50 includes IFCs 60A-60N (collectively, "IFCs 60"), management interface 62, control unit 70, and forwarding unit 80. Control unit 70 includes service/tunnel color unit 72 and processing circuitry 74. Forwarding unit 80 includes forwarding manager 82, memory 84, tunnel selection scheme 86, processing circuitry 88, and packet processor 90. In some examples, network device 50 may be an example of first network device 20 of FIG. 1 and IFCs 60 may be an example of IFCs 21 of FIG. 1. In some examples, network device 50 may be an example of second network device 30 of FIG. 1 and IFCs 60 may be an example of IFCs 31 of FIG. 1.

Network device 50 may represent a router such as a provider edge or customer edge router, a core router, or another type of network device, such as a switch. In this example, network device 50 includes a control unit 70 that provides control plane functionality for the device. Forwarding unit 80 may provide a data plane for processing network traffic. In this way, forwarding unit 80 may be referred to herein as a "forwarding plane." Forwarding unit 80 may receive and send data packets via interfaces of IFCs 60. Control unit 70 may be connected to each forwarding unit 80 by an internal communication link. The internal communication link may include a 100 Mbps Ethernet connection, for instance. Control unit 70 configures, by sending instructions and other configuration data via the internal communication link, forwarding unit 80 to define control processing operations applied to packets received by forwarding unit 80.

Control unit 70 may execute a plurality of applications, including service/tunnel color unit 72. Service/tunnel color unit 72 may perform, in response to receiving information via management interface 62, one or more operations. In some examples, the one or more operations may include one or more of assigning a tunnel color to one or more tunnels (e.g., one or more tunnels of tunnels 42, 44, 46), linking a service color to one or more tunnel colors such as a primary tunnel color and one or more fallback tunnel colors, and implementing instructions for load balancing network traffic.

Control unit 70 may include processing circuitry 74 that executes software instructions, such as those used to define a software or computer program, stored to a computer-readable storage medium (again, not shown in FIG. 1), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause processing circuitry 74 to perform techniques described herein. Alternatively, or in addition, control unit 70 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. In some examples, processing circuitry 74 executes one or more operations of service/tunnel color unit 72.

Forwarding unit 80 includes forwarding manager 82, which may perform one or more operations in order to forward packets through packet processor 90. For example, forwarding manager 82 may include memory 84. Memory 84 may be configured to store tunnel selection scheme 86. Tunnel selection scheme 86 may, in some examples, specify a primary mapping mode and one or more fallback mapping modes for mapping a network service to one or more transport tunnels. In this way, when packet processor 90 receives a packet, one or more components of forwarding unit 80 may determine a service color of a network service associated with the packet. In turn, forwarding unit 80 may determine a tunnel of tunnels 42, 44, 46 of FIG. 1 in which to forward the packet based on one or more attributes associated with the tunnels 42, 44, 46. Memory 84 may store a list of tunnels that indicates one or more tunnel attributes associated with each tunnel 42, 44, 46 on the list of tunnels. Additionally, memory 84 may store a list of services that indicates one or more service colors associated with the list of services. Forwarding manager 82 may update tunnel selection scheme 86, the list of tunnels, and the list of services based on one or more instructions received from control unit 70. In some examples, processing circuitry 88 may execute one or more operations to update tunnel selection scheme 86, update the list of tunnels stored by memory 84, or update the list of services stored by memory 84.

Forwarding manager 82 may include processing circuitry 88. Processing circuitry 88 may, in some cases, be separate from processing circuitry 74. Processing circuitry 88 that executes software instructions, such as those used to define a software or computer program, stored to a computer-readable storage medium (again, not shown in FIG. 1), such as non-transitory computer-readable mediums including a storage device (e.g., a disk drive, or an optical drive) and/or a memory such as RAM (including various forms of DRAM, e.g., DDR2 SDRAM, or SRAM), Flash memory, another form of fixed or removable storage medium that can be used to carry or store desired program code and program data in the form of instructions or data structures and that can be accessed by a processor, or any other type of volatile or non-volatile memory that stores instructions to cause processing circuitry 88 to perform techniques described herein. Alternatively, or in addition, forwarding manager 82 may include dedicated hardware, such as one or more integrated circuits, one or more ASICs, one or more ASSPs, one or more FPGAs, or any combination of one or more of the foregoing examples of dedicated hardware, for performing the techniques described herein.

Forwarding unit 80 includes packet processor 90 that processes packets by performing a series of operations on each packet over respective internal packet forwarding paths as the packets traverse the internal architecture of network device 50. Packet processor 90 of forwarding unit 80, for instance, includes one or more configurable hardware chips (e.g., a chipset) that, when configured by applications executing on control unit 70, define the operations to be performed by packets received by forwarding unit 80. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic.

Operations may be performed, for example, on each packet by forwarding unit 80 or other components of network device 50 to which the packet is directed prior to egress, such as one or more service cards. Packet processor 90 may process packets to identify packet properties and perform actions bound to the properties. Packet processor 90 may include forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. In one example, packet processor 90 arranges forwarding path elements as next hop data that can be chained together as a series of "hops" in a forwarding topology along an internal packet forwarding path for network device 50. The result of packet processing determines a manner in which a packet is forwarded or otherwise processed by packet processor 90 of forwarding unit 80 from its input interface on one of IFCs 60 to, at least in some cases, its output interface on one of IFCs 60.

In many instances, the forwarding path elements perform lookup operations, such as a tree (or trie) search, a table (or index) search, a filter determination and application, or a rate limiter determination and application. Lookup operations locate, within a lookup data structure (e.g., a lookup tree), an item that matches packet contents or another property of the packet or packet flow, such as the inbound interface of the packet.

Applications configured for execution by network device 50 determine one or more control processing operations to be applied to packets by packet processor 90. In network device 50, applications include service/tunnel color unit 72. Applications may configure packet processor 90 to perform the control processing operations by sending, to forwarding unit 80, data representing the control processing operations. Such data may include forwarding path elements representing high-level packet processing requirements (e.g., route lookup and filtering). Control processing operations may include fundamental packet forwarding operations such as input packet processing, route lookup, and output packet processing, as well as service functions such as packet filtering or access control, statistical sampling, traffic policing, rate limiting, and accounting.

In accordance with the techniques of the disclosure, control unit 70 receives, from controller 10 of FIG. 1, a service-specific tunnel selection scheme. Control unit 70 stores the received tunnel selection scheme as tunnel selection scheme 86 in memory 84. Tunnel selection scheme 86 specifies a primary mapping mode for mapping a corresponding network service to a primary transport tunnel of tunnels 42, 44, 46 and at least one fallback mapping mode for mapping the network service to at least one fallback transport tunnel of tunnels 42, 44, 46. As described in more detail below, in some examples, the primary mapping mode is categorized according to a first type, e.g., tunnel colorization, while the at least one fallback mapping modes are categorized according to a second type other than tunnel colorization.

In some examples, control unit 70 receives, via IFCs 60, one or more packets. Control unit 70 receives, from controller 10, an exterior gateway protocol message that comprises a payload prefix specifying one or more service parameters (e.g., a service color or service type) of a network service associated with the one or more received packets. Further, control unit 70 receives, from controller 10, an exterior gateway protocol message that comprises a payload prefix specifying one or more attributes (e.g., tunnel color) associated with each of tunnels 42, 44, 46. Control unit 70 additionally receives, from controller 10, an exterior gateway protocol message that comprises a plurality of tunnel selection schemes, each tunnel selection scheme corresponding to a different service of a plurality of network services. In some examples, each tunnel selection scheme is associated with a different service type. In some examples, each tunnel selection scheme is associated with a different service color. Such exterior gateway protocol messages may be e.g., BGP UPDATE messages sent in accordance with BGP.

Control unit 70 retrieves, from memory 84, a tunnel selection scheme 86 corresponding to the network service associated with the one or more packets. Tunnel selection scheme 86 identifies, for the corresponding network service, a primary mapping mode for mapping the network service to a primary transport tunnel of tunnels 42, 44, 46. In some examples, the primary mapping mode may be categorized according to a first type, e.g., tunnel colorization. For example, the primary transport tunnel comprises a tunnel color that is the same as a service color associated with the network service. For example, a network service corresponding to the service-specific tunnel selection scheme may be assigned a service color of "red." The primary mapping mode of the service-specific tunnel selection scheme may designate tunnel 42A as the primary transport tunnel, where tunnel 42A is assigned, e.g., a tunnel color of "red."

Tunnel selection scheme 86 further identifies, for the corresponding network service, at least one fallback mapping mode for mapping the network service to at least one fallback transport tunnel of tunnels 42, 44, 46. The service-specific tunnel selection scheme may specify a plurality of fallback mapping modes such that, if a first fallback mapping mode fails, the network device may continue to try numerous fallback mapping modes until a reachable tunnel is found for transporting the network traffic associated with the network service. For example, in response to determining that the network service cannot be mapped to the primary transport tunnel according to the primary mapping mode, control unit 70 maps, based on the at least one fallback mapping mode, the network service to the at least one fallback transport tunnel. Control unit 70 forwards network traffic associated with the network service via the at least one fallback transport tunnel.

With respect to the foregoing example, the network service corresponding to the service-specific tunnel selection scheme may be assigned a service color of "red." A first fallback mapping mode of tunnel selection scheme 86 may designate tunnel 44A as a first fallback transport tunnel, where tunnel 44A comprises, e.g., an IGP route corresponding to a destination of the network traffic associated with the network service. A second fallback mapping mode of tunnel selection scheme 86 may designate tunnel 44B as a second fallback transport tunnel, where tunnel 44B is associated with an IP tunnel endpoint address prefix of a destination of the network traffic associated with the network service. A third fallback mapping mode of tunnel selection scheme 86 may designate tunnel 46A as a third fallback transport tunnel, where tunnel 46A is associated with an IPv6 conversion of a IPv4 tunnel endpoint address prefix of second network device 30 (e.g., a destination of the network traffic associated with the network service). A fourth fallback mapping mode of tunnel selection scheme 86 may designate tunnel 46B as a fourth fallback transport tunnel, etc.

Control unit 70 applies tunnel selection scheme 86 to map the network service to a reachable transport tunnel of tunnels 42, 44, 46. For example, control unit 70 attempts to map the network service to the primary transport tunnel (e.g., tunnel 42A) according to the primary mapping mode specified by tunnel selection scheme 86. If successful, control unit 70 forwards network traffic associated with the network service via the primary transport tunnel (e.g., tunnel 42A).

However, in the event that the primary mapping mode fails, control unit 70 may use the at least one fallback mapping mode specified by tunnel selection scheme 86 to map the network service to at least one fallback transport tunnel of tunnels 42, 44, 46 such that control unit 70 may still forward the network traffic associated with the network service to a destination (e.g., an IP address prefix) of the network traffic. For example, in response to determining that the network service cannot be mapped to tunnel 42A (e.g., the primary transport tunnel) according to the primary mapping mode, control unit 70 attempts to map the network service to the first fallback transport tunnel (e.g., tunnel 44A) according to the first fallback mode. If successful, control unit 70 forwards network traffic associated with the network service via the first fallback transport tunnel (e.g., tunnel 44A). However, if the first fallback mapping mode fails, control unit 70 may continue attempting to map the network service to fallback transport tunnels in accordance with an order of the fallback mapping modes specified by tunnel selection scheme 86. For example, control unit 70 may attempt to map the network service to each of tunnel 44B (e.g., the second fallback transport tunnel), tunnel 46A (e.g., the third fallback transport tunnel), and tunnel 46B (e.g., the fourth fallback transport tunnel), and so on until control unit 70 successfully maps the network service to a transport tunnel of tunnels 42, 44, 46. In this way, tunnel selection scheme 86 may allow control unit 70 to use various tunnels of various types as fallbacks for mapping the network service such that control unit 70 may forward network traffic associated with the network service to a destination even where a preferred transport tunnel of a preferred type is not available.

In some examples, each of the at least one fallback mapping modes may be categorized according to types other than the type of the primary mapping mode. For example, where the primary mapping mode is categorized according to a type of tunnel colorization, each of the at least one fallback mapping modes may be categorized according to types other than tunnel colorization, such as IGP, tunnel endpoint IP address prefix, IPv6 conversion of an IPv4 tunnel endpoint address prefix, etc. For example, regardless of whether the at least one fallback transport tunnel is assigned a tunnel color that corresponds to a service color of the network service, is assigned a tunnel color that does not correspond to the service color of the network service, or is uncolored (e.g., not assigned any tunnel color), control unit 70 may map the network service to the at least one fallback transport tunnel based on, e.g., the at least one fallback transport tunnel corresponding to an IGP route to a destination of the network traffic associated with the network service, comprising a tunnel endpoint IP address prefix of the destination of the network traffic associated with the network service, or comprising an IPv6 address prefix converted from an IPv4 address prefix of the destination of the network traffic associated with the network service, etc.

In this fashion, control unit 70 may map the network service to at least one fallback transport tunnel that comprises, e.g., a transport tunnel having a tunnel color that is different than the service color associated with the network service, an uncolored transport tunnel, a transport tunnel corresponding to an IGP route to the destination of the network traffic associated with the network service, a transport tunnel associated with an IP address of the destination of the network traffic associated with the network service, or a transport tunnel associated with an IPv6 conversion of an IPv4 address of the destination of the network traffic associated with the network service, etc., such that control unit 70 may forward the one or more packets associated with the network service to a destination even where a primary transport tunnel (e.g., tunnel 42A), which may be preferred for transporting the one or more packets, is unavailable.

The use of fallback mapping modes may be optional, in that in some examples, tunnel selection scheme 86 may specify no fallback mapping modes, one fallback mapping mode, or multiple fallback mapping modes. Each of the different fallback mapping modes specified by tunnel selection scheme 86 may describe mapping modes grouped according to similar types (also referred to herein as "categories") (e.g., tunnels grouped by tunnel coloration, IP address, protocol, etc.) or of different types or categories. Typically, tunnel selection scheme 86 ranks each of the mapping modes by preference such that control unit 70 attempts to map the network service to a most-preferred transport tunnel of a most-preferred type, and then a second-most-preferred transport tunnel of the most-preferred type, etc., followed by a most-preferred transport tunnel of a second-most-preferred type, and then a second-most-preferred transport tunnel of the second-most-preferred type, and ending with a least-preferred transport tunnel of a least-preferred type, etc.

The techniques of the disclosure may enable traffic steering to be applied per user intent, with very fine per-service granularity for mapping network services to tunnels. Further the techniques of the disclosure enable a network device to use a number of tunnels that is greater than a max-ecmp tunnel limit (between a pair of endpoints) for a given service. Further, the techniques of the disclosure enable a network device to load-balance network traffic over a user-defined set of tunnels. Further, the techniques of the disclosure obviate a requirement to configure multiple loopback addresses. Therefore, the techniques of the disclosure enable a user to define a generic framework specifying inter-relationships between various tunnels of various types in terms of traffic steering in a manner that is agnostic to tunnel type, classification, color, or protocol.

Figure 3:
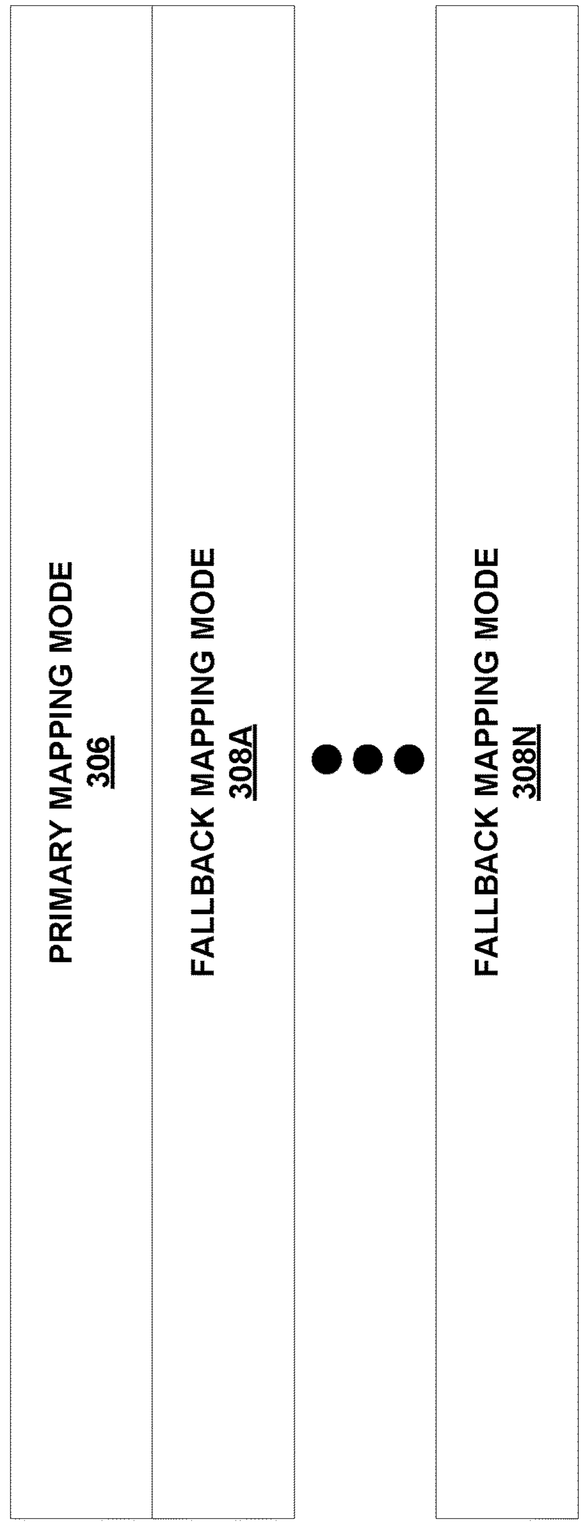
FIG. 3 is a block diagram illustrating an example tunnel selection scheme in accordance with one or more techniques of this disclosure.

FIG. 3 is a block diagram illustrating example tunnel selection scheme 300 in accordance with one or more techniques of this disclosure. Tunnel selection scheme 300 comprises primary mapping mode 306 and a plurality of fallback mapping modes 308A-308N (hereinafter, "fallback mapping modes 308" or "extended mapping modes 308").

In network of FIG. 1, first network device 20 has learned routes from a remote network device, such as second network device 30. First network device 20 needs to determine a reachability of these routes before the routes can be made active in a process referred to as route resolution. For example, these routes may be family inet BGP routes that first network device 20 may have learned over a multi-hop BGP peering.

The IP address of second network device 30 maybe reachable at first network device 20, using multiple different methods, such as by using colored tunnels, uncolored tunnels, or IGP routes, or the use of one of the foregoing via other IP address families (e.g., by converting an IPv4 address to an IPv6 address, or converting an IPv6 address to an IPv4 address). For example, an IP address of second network device 30 may be an IPv4 address, and second network device 30 may be reachable to first network device 20 over tunnels or IGP routes corresponding to IPv4-to-IPv6 mapped addresses obtained from the IPv4 address of second network device 30.

The routes for the above kinds of reachability reside in different RIBs of first network device 20. In the presence of multiple ways to resolve the address and protocol of the next hop, a user may desire to specify intent (e.g., on a per-service route basis) so as to specify a resolution order performed by first network device 20. For example, a user may desire to specify each of the ways that first network device 20 should attempt tunnel resolution and an order in which to do so where a preceding resolution attempt does not succeed.

In the presence of N ways to do route-resolution, there may be $2^N-1$ permutations possible to perform route-resolution. First network device 20 requires an efficient way to support all of these permutations of tunnel resolution. For a given permutation, first network device 20 may build a route-resolution tree by merging routes from each of the different RIBs. However, with $2^N-1$ permutations, the resolution tree may have a large number of elements if the routes from the different RIBs are merged.

As described above, the disclosure sets forth techniques for color-based tunnel selection for Border Gateway Protocol (BGP) payload prefixes. The techniques set forth herein define a set of extended mapping modes 308, and describes how to use extended mapping modes 308 to construct tunnel selection schemes to achieve flexible tunnel selection. Tunnel selection schemes can be implemented as policies on network devices performing tunnel selection, such as network devices 20 and 30 of FIG. 1, or signaled by next hop routers or central controller 10 via BGP. The tunnel selection schemes described herein define a "resolution map" which allows a user to specify user intent for specifying a number of resolution fallbacks and an order of application for each of the resolution fallbacks.

By referencing a route-map in the routing policy, first network device 20 may apply a tunnel selection scheme on a per-service route basis. Further, to support the 2N−1 permutations, the tunnel selection scheme allows the separation of resolution trees from resolution fallback. Because the resolution trees are independent from the resolution fallbacks, the resolution tree for each possible fallback may be built from a single RIB. Thus, the techniques of the disclosure allow for cascading resolutions across fallback types, so as to enable the use of resolution fallbacks without creating more than a linear number of resolution-trees.

For example, a network device, such as network device 50 of FIG. 2, may receive packets via one or more ingress interface cards (e.g., ones of IFCs 60) and forward packets via one or more egress interface cards (e.g., ones of IFCs 60), the one or more egress interface cards hosting a set of tunnels (e.g., tunnels 42, 44, 46). The set of tunnels 42, 44, 46 may, in some cases, connect the network device 50 to another network device (e.g., where network device 50 is an example of first network device 20 of FIG. 1, to second network device 30 of FIG. 1) such that each tunnel of the set of tunnels 42, 44, 46 leads from network device 50 to a common tunnel destination. The common tunnel destination may also be referred to herein as an "IP endpoint address" or "IP endpoint tunnel address." In some examples, the IP endpoint address comprises an IP address prefix (e.g., that specifies a subnet, subnetwork, or group of hosts). In some examples, the IP endpoint address further comprises a host identifier that specifies a particular host within the subnet. Together, the IP address prefix and host identifier may form a complete IP address.

In a network using BGP to advertise payload prefixes, transporting the packets of a prefix from network device 50 to a network device, such as a next hop router, relies on the selection of a transport tunnel. This selection is normally based on the prefix's BGP next hop IP address and some constraints. One such constraint is the color, which is encoded in the Color Extended Community set forth in P. Mohapatra et al., "The BGP Encapsulation Subsequent Address Family Identifier (SAFI) and the BGP Tunnel Encapsulation Attribute," Internet Engineering Task Force (IETF) RFC 5512 (April 2009), the entire content of which is incorporated herein by reference. Color is a generic notion which may represent any characteristic or property of the network, such as virtual topology, network slice, path computation algorithm, TE constraint, administrative profile, etc. As described herein, tunnel selection considering color as a constraint is broadly referred to as color-based tunnel selection.

In a color-based tunnel selection scenario, payload prefixes may be associated with colors, through either configuration or the attachment of an Color Extended Community. Likewise, transport tunnels may also be associated with colors. In some examples, colors may be encoded in BGP Network Layer Reachability Information (NLRI) (e.g. BGP Segment Routing-Traffic Engineering (SR-TE) policy as set forth in S. Previdi et al., "Advertising Segment Routing Policies in BGP, draft-ietf-idr-segment-routing-te-policy-07," IETF, Internet Draft, Jul. 5, 2019, (available at https://www.ietf.org/id/draft-ietf-idr-segment-routing-te-policy-07.txt), the entire content of which is incorporated herein by reference.). In some examples, colors may be attached as an Extended Color Community (e.g. BGP Labeled Unicast as set forth in Y. Rekhter, et. al., "Carrying Label Information in BGP-4", IETF, RFC 3107 (May 2001), the entire content of which is incorporated herein by reference.). In some examples, colors may be assigned by configuration (e.g. Resource ReSerVation Protocol (RSVP) as set forth in R. Braden, et. al., "Resource ReSerVation Protocol (RSVP)", IETF, RFC 2205 (September 1997), or Label Distribution Protocol (LDP) tunnels) as set forth in L. Andersson, et. al., "LDP Specification", IETF, RFC 5036 (October 2007), the entire content of each of which is incorporated herein by reference.). These payload prefixes and tunnels are called "colored payload prefixes" and "colored tunnels", respectively. In general, a payload prefix of color X is expected to be mapped to a tunnel of the same color X for transport. This is referred to as primary mapping mode 306 of color-based tunnel selection. Primary mapping mode 306 may also be referred to as "default mapping mode 306."

In accordance with the techniques of the disclosure, when a tunnel of color X cannot be found, a network operator may choose to continue the tunnel selection based on other mapping modes 308, e.g. a tunnel of another color Y, a tunnel without a color, a tunnel of color X but with an Internet Protocol Version 4 (IPv4)-mapped Internet Protocol Version 6 (IPv6) endpoint address, etc. These mapping modes 208 provide the network operator with the flexibility to take a full advantage of the tunnels in the network. As described herein, these modes are called "extended mapping modes," and the procedure of attempting them in a user-defined order is called "fallback."

As described herein, a set of extended mapping modes 308 are defined which complement the default mapping mode 306. The disclosure introduces the notion of "tunnel selection schemes." A tunnel selection scheme is an ordered list of extended mapping modes 308, which is executed in tunnel selection. When a tunnel cannot be selected by using the first mode 308A in the list, fallback is performed by attempting the second mode 308B, the third mode 308C, and so on, until a tunnel is selected, or the list is exhausted.

Color-based tunnel selection for uncolored payload prefixes may be considered as a special case. By using a tunnel selection scheme, an uncolored payload prefix can select a colored or uncolored tunnel in a flexible manner.

This disclosure defines a set of extended mapping modes 308 for flexible color-based tunnel selection. Each mode specifies how a payload prefix's endpoint IPv4 or IPv6 address (derived from BGP next hop and the Tunnel Endpoint sub-Type-Length-Value (TLV) in the Tunnel Encapsulation Attribute (set forth by K. Patel et al., "The BGP Tunnel Encapsulation Attribute, draft-ietf-idr-tunnel-encaps-14," IETF, Internet Draft, Sep. 30, 2019, (available at https://www.ietforg/id/draft-ietf-idr-tunnel-encaps-14.txt), the entire content of which is incorporated herein by reference.) and color are used to select a tunnel. Typically, each payload prefix has a single color or no color, and each tunnel has a single color or no color, which is the common usage of colors.

In the definitions of the extended mapping modes 308 below, N represents a payload prefix's endpoint IPv4 or IPv6 address, and C represents its color, if applicable. An uncolored payload prefix does not have a color. Each extended mapping mode 308 may involve multiple steps or sublevel fallback within it. The mode 308 is completed as soon as a tunnel is successfully selected in a certain step, and the following steps are not executed.

The following sets forth different types (e.g., or categories) by which mapping modes may be categorized:

IP-color, optionally with a fallback color list of {C1, . . . , Cn}. This type allows a network device to map a service to a tunnel comprising an endpoint address prefix that matches a specified endpoint address prefix and comprises a tunnel color matching a specified color. An example algorithm is set forth below:

If the payload prefix has a color C, select a tunnel whose endpoint address is N and whose color is C:

Select a tunnel whose endpoint address is N and whose color is C1.

Select a tunnel whose endpoint address is N and color is Cn.

Color-only, optionally with a fallback color list of {C1, . . . , Cn}. This type allows a user to select a tunnel that comprises a tunnel color matching a specified color regardless of the endpoint address prefix of the tunnel. An example algorithm is set forth below:

If the payload prefix has a color C, select a tunnel whose color is C, regardless of the tunnel's endpoint address.

Select a tunnel whose color is C1, regardless of tunnel's endpoint address.

Select a tunnel whose color is Cn, regardless of tunnel's endpoint address.

IP-any-color. This type allows a network device to map a service to a tunnel that matches a specified endpoint address prefix and comprises a tunnel color of any value (e.g., not uncolored). An example algorithm is set forth below:

Select a tunnel whose endpoint address is N and who has a color of any value.

IP-only. This type allows a network device to map a service to a tunnel that matches a specified endpoint address prefix and does not have a tunnel color attribute (e.g., is uncolored). An example algorithm is set forth below:

Select a tunnel whose endpoint address is N and who does not have a color.

Converted-IPv6. This type allows a network device to map a service to a tunnel comprising an IPv6 tunnel endpoint address prefix that matches a conversion of a specified IPv4 tunnel endpoint address prefix and does not have a tunnel color attribute (e.g., is uncolored). An example algorithm is set forth below:

This mode is applicable when N is an IPv4 address. Assume N' is the IPv6 address mapped from N.

Select a tunnel whose endpoint address is N' and who does not have a color.

Converted-IPv6-color, optionally a fallback color list of {C1, . . . , Cn}. This type allows a network device to map a service to a tunnel comprising an IPv6 tunnel endpoint address prefix that matches a conversion of a specified IPv4 tunnel endpoint address prefix and comprises a tunnel color matching a specified color. An example algorithm is set forth below:

This mode is applicable when N is an IPv4 address. Assume N' is the IPv6 address mapped from N.

If the payload prefix has a color C, select a tunnel whose endpoint address is N' and whose color is C.

Select a tunnel whose endpoint address is N' and whose color is C1.

Select a tunnel whose endpoint address is N' and whose color is Cn.

Converted-IPv6-any-color. This type allows a network device to map a service to a tunnel comprising an IPv6 tunnel endpoint address prefix that matches a conversion of a specified IPv4 tunnel endpoint address prefix and comprises a tunnel color of any value (e.g., not uncolored). An example algorithm is set forth below:

This mode is applicable when N is an IPv4 address. Assume N' is the IPv6 address mapped from N.

Select a tunnel whose endpoint address is N' and who has a color of any value.

Color-profile. This type allows a network device to use a specified color to look up a profile which specifies tunnel selection constraints for selecting a tunnel. The network device may apply the tunnel selection constrains to identify one or more tunnels to which the service may be mapped. An example algorithm is set forth below:

If the payload prefix has a color C, use C as key to look up a profile to construct tunnel selection constraints, and use the constraints to select a tunnel.

As shown above, the IP-color, Color-only, and Converted-IPv6-color modes may have a fallback color list for achieving sub-level "crosscolor" fallback. More modes may be defined in the future in addition to or in the alternative to the modes described above.

A tunnel selection scheme is defined by an ordered list of extended mapping modes 308. The first mode is called "primary" mapping mode 306, and all the subsequent modes are called "fallback" mapping modes 308. A tunnel selection scheme includes a primary mapping mode 306 and optionally includes one or more fallback modes 308.

When a tunnel selection scheme is executed, each mode in the list is attempted one at a time sequentially, and within the mode, each step is executed sequentially. The process continues until a tunnel is selected or the list is exhausted. When a given a tunnel is selected successfully by a certain step of a certain mode, the scheme is considered as completed, and all subsequent steps of the mode and all the subsequent modes in the list are skipped. If no tunnel is selected when the list is exhausted, the corresponding payload prefix remains as unresolved for transport. When a previously selected tunnel becomes inoperative, the scheme is rerun to select a new tunnel.

It is possible that a tunnel was previously selected, and sometime later another tunnel of higher preference (in the tunnel selection scheme or in a fallback color list) becomes available. In this case, the new tunnel may be selected to replace the current tunnel. This procedure is called reversion. A reversion may be performed manually by a network operator, or triggered automatically by the situation.

Note that a tunnel selection scheme with extended mapping modes is a new criterion added to tunnel selection. A tunnel selection scheme is typically used in parallel with other applicable criteria, such as protocol type, tunnel type, or attributes contained in the Tunnel Encapsulation Attribute.

The following are some examples of tunnel selection schemes.

Example 1: Assume a payload prefix has a tunnel endpoint IPv4 address 203.0.113.1 and a color RED, and it is associated with the following tunnel selection scheme.

(1) IP-color
(2) Converted-IPv6-color
(3) IP-only

The intended tunnel selection procedure is:

(1) Find a tunnel whose endpoint IPv4 address is 203.0.113.1 and whose color is RED.
(2) If the above is unsuccessful, convert the IPv4 address to an IPv6 address 2002:cb00:7101::/64. Find a tunnel whose endpoint IPv6 address is 2002:cb00:7101::/64 and whose color is RED.
(3) If the above is unsuccessful, find a tunnel whose endpoint IPv4 address is 203.0.113.1 and who does not have a color.

Example 2: Assume a prefix has a tunnel endpoint IPv4 address 203.0.113.1 and a color RED, and it is associated with the following tunnel selection scheme.

(1) IP-color, with a fallback color list={BLUE, GREEN}
(2) Converted-IPv6-color, with a fallback color list={WHITE}
(3) IP-only An example tunnel selection procedure is:

(1) Find a tunnel whose endpoint IPv4 address is 203.0.113.1 and whose color is RED. If it is unsuccessful, find a tunnel whose endpoint IPv4 address is 203.0.113.1 and whose color is BLUE. If it is unsuccessful, find a tunnel whose endpoint IPv4 address is 203.0.113.1 and whose color GREEN.
(2) If the above is unsuccessful, convert the IPv4 address to an IPv6 address 2002:cb00:7101::/64. Find a tunnel whose endpoint IPv6 address is 2002:cb00:7101::/64 and whose color is RED. If it is unsuccessful, find a tunnel whose endpoint IPv6 address is 2002:cb00:7101::/64 and whose color is WHITE.
(3) If the above is unsuccessful, find a tunnel whose endpoint IPv4 address is 203.0.113.1 and who does not have a color.

Figure 4:
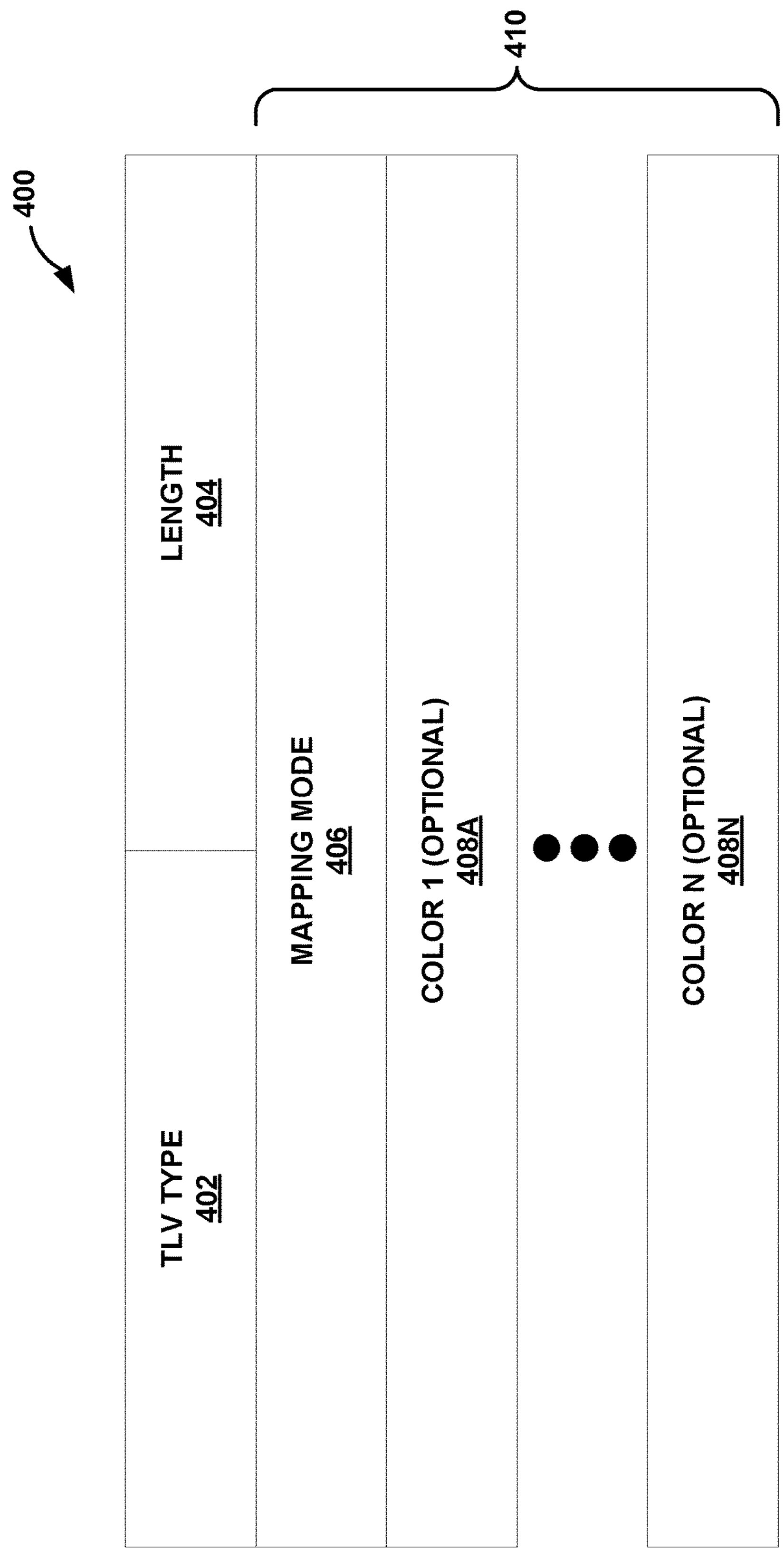
FIG. 4 is a block diagram illustrating an example message for specifying one or more mapping modes in accordance with one or more techniques of this disclosure.

FIG. 4 is a block diagram illustrating example message 400 for specifying one or more mapping modes 406 in accordance with one or more techniques of this disclosure. In some examples, mapping modes 406 may be examples of primary mapping mode 306 and one or more fallback mapping modes 308 of FIG. 3. In some examples, message 400 comprises an exterior gateway protocol message. In some examples, the exterior gateway protocol is BGP. For example, message 400 may be a BGP UPDATE message comprising an extended community.

As described above, a tunnel selection scheme with extended mapping modes 308 may be provisioned for a payload prefix on, e.g., first network device 20 which performs tunnel selection. In this case, the scheme may be implemented as a policy and applied on first network device 20. The syntax of such policy may vary by vendors.

The tunnel selection scheme may also be provisioned on the BGP next hop network device or central controller 10 where UPDATE message 400 of the payload prefix is originated. To facilitate this, the disclosure sets forth a "Flexible Color Tunnel Selection" attribute to carry the information in UPDATE message 400.

In the case where a given payload prefix has one scheme specified by a local policy on the current network device, and another scheme received in the Flexible Color Tunnel Selection attribute, network device 20 treats the policy as a higher preference than the received information.

If a payload prefix does not have any associated tunnel selection scheme, the default mode applicable to a colored or non-colored payload prefix is used in tunnel selection.

The Flexible Color Tunnel Selection attribute is an optional, nontransitive BGP path attribute that is used to carry the information of a tunnel selection scheme. It is defined as a set of Type/Length/Value (TLV) triplets. By advertising the Flexible Color Tunnel Selection attribute in UPDATE message 400 of a payload prefix, the BGP speaker expresses the fact that it expects the tunnel selection process of the payload prefix to use the contained information.

In accordance with the techniques of the disclosure, a new TLV, the Extended Mapping Mode TLV, is described. The Extended Mapping Mode TLV carries the information of an extended mapping mode. For example, the Extended Mapping Mode TLV may include TLV Type 402, TLV length 494, mapping mode 406, and optionally may specify one or more colors 408A-408N (hereinafter, "colors 408"). As an example, TLV Type 402 is 0x01. TLV Length 404 is the total number of octets of TLV Value field 410. TLV Value field 410 comprises a 4-octet extended mapping mode 406 defined as below, and an optional fallback color list 408.

In some examples, extended mapping mode 406 specifies one of the following types or categories of extended mapping modes:

(1) IP-color;
(2) Color-only;
(3) IP-any-color;
(4) IP-only;
(5) Converted-IPv6;
(6) Converted-IPv6-color;
(7) Converted-IPv6-any-color;
(8) Color-profile.

The IP-color, Color-only and Converted-IPv6-color modes may optionally have a fallback color list. The list contains one or multiple 4-octect color values, e.g., Color_1, . . . , Color_n, in the order from the highest preference to the lowest preference.

Extended Mapping Mode messages 400 are encoded in the Flexible Color Tunnel Selection attribute in the following manner. First, an Extended Mapping Mode message 400 comprising a mapping mode 406 specifying a primary mapping mode is added. If this mode is IP-Color, Color-Only, or Converted-IPv6-Color, and if cross-color fallback is applicable to this mode, the TLV contains a fallback color list 408.

If there is one or multiple desired fallback modes, another Extended Mapping Mode message 400 comprising a mapping mode 406 specifying the first fallback mode is added. If this mode is IP-Color, Color-Only, or Converted-IPv6-Color, and if cross-color fallback is applicable to this mode, the TLV contains a fallback color list 408.

This process continues, until an Extended Mapping Mode message 400 comprising a mapping mode 406 specifying the last fallback mode is added. If this mode is IPColor, Color-Only, or Converted-IPv6-Color, and if cross-color fallback is applicable to this mode, the TLV contains a fallback color list 408.

In decoding a received Flexible Color Tunnel Selection attribute, a receiving network device interprets the preference order as the above for the Extended Mapping Mode messages 400 contained. In some examples, if an Extended Mapping Mode message 400 contains a mapping mode which is not IP-Color, Color-Only, or Converted-IPv6-Color but has a fallback color list 408, the entire Flexible Color Tunnel Selection attribute is considered as malformatted and ignored. In this case, tunnel selection for the payload prefix reverts to the default color or non-color mapping mode.

A receiving network device considers a payload prefix as having a modified tunnel selection scheme in any of the following situations, and perform tunnel selection accordingly:

(1) The payload prefix did not have a Flexible Color Tunnel Selection attribute in the previous UPDATE message 400, and it has one in the latest UPDATE message 400. Tunnel selection is performed based on the latest tunnel selection scheme.

(2) The payload prefix had a Flexible Color Tunnel Selection attribute in the previous UPDATE message 400, but it does not have one in the latest UPDATE message 400. Tunnel selection reverts to the default color or non-color mapping mode.

(3) The payload prefix had a Flexible Color Tunnel Selection attribute in the previous UPDATE message 400, and it has one with different content in the latest UPDATE message 400. Tunnel selection is performed based on the latest tunnel selection scheme.

C. Filsfils et al., "Segment Routing Architecture," Internet Engineering Task Force (IETF) RFC 8402 (July 2018), the entire content of which is incorporated herein by reference, and S. Previdi et al., "Advertising Segment Routing Policies in BGP, draft-ietf-idr-segment-routing-te-policy-07," described above, define two "Color-Only" bits (e.g., CO bits) in the BGP Color Extended Community for color-based tunnel selection in the context of segment routing. Each of the four combinations of the CO bits corresponds to a predefined fallback scheme. The disclosure enhances the techniques for color-based tunnel selection by supporting more generic and flexible fallback schemes which are user definable. In fact, the fallback schemes of the CO bits can be fully specified by using the Flexible Color Based Tunnel Selection attribute. If the Color Extended Community with CO bits are used in an UPDATE message, the Flexible Color Tunnel Selection attribute is not used at the same time to avoid possible collision between them. In case they are both present in an UPDATE message, preference is given to the CO bits, and the Flexible Color Tunnel Selection attribute is ignored.

Example message 400 may be used to implement service mapping, as described as follows. Service mapping is the steering of service traffic into a tunnel(-set) as per a user's per-service-construct and/or per-service-data-flow "traffic-steering" intent. This involves creating the relevant per-service route and next-hop-topology for the service-route(s). Traffic-steering makes more sense when the user intends to map service-traffic over tunnel(s) and may be less useful where the service-traffic is meant to be hop-by-hop routed. A network operator may use service-mapping to either provide differential traffic forwarding to traffic for various services: e.g., L3VPN traffic over LDP and L2circuit traffic over specific RSVP LSP. Another class of use-cases would be try out a new tunnel-type for a limited subset of service traffic. Service mapping may include four components: user intent, mapping the user's configuration intent to routing constructs, service-route-resolution (e.g., resolving service routes to a set of one or more tunnels per the user's intent), and encoding the "service-resolution" in the route/next-hop constructs to enact the user-intent. The techniques of the disclosure address the problem of service-mapping in a tunnel-agnostic manner and regardless of which service's traffic is meant to be mapped to those tunnels.

Given two network devices (e.g., network devices 20 and 30 of FIG. 1), between which exist multiple tunnels 42, 44, 46, and these routers serve as PEs for multiple services, e.g., L3VPN and EVPN. For each of the tunnels 42, 44, 46, there may be a route in RIB inet.3 of network device 20. When establishing the tunnels of a given tunnel-type (say RSVP), first network device 20 installs next-hops into a tunnel-type-specific route installed in the RIB inet.3 of network device 20. Associated with each of these per-tunnel-type routes for second network device 30 is a protocol preference.

When first network device 20 learns certain service routes from second network device 30, first network device 20 needs to determine reachability for these service routes. In some examples, first network device 20 uses a software module called a route-resolver to determine this reachability. The resolver does a lookup for the IP address of second network device 30 in a resolution-tree to determine if second network device 30 is reachable from first network device 20. This resolution tree (for finding a tunnel) is made from the routes in inet.3. When routes for the same IP address have been installed by multiple tunnel-types, first network device 20 uses only the most-preferred route to construct the resolution tree. For example, when first network device 20 installs both RSVP and LDP tunnel routes in inet.3, first network device 20 installs only the RSVP route in the resolution tree where a default preference is to use RSVP. However, a service that may want to map traffic to LDP may be unable to use the resolver to lookup the IP address of second network device 30 to return the LDP routes where only the RSVP route is installed. Thus, mapping of the service traffic over LDP is not possible.

In accordance with the techniques of the disclosure, first network device 20 uses service mapping to establish fallback route resolution for a network service. For example, by coloring the per-tunnel-type tunnel routes and installing them in a separate RIB (inetcolor.0), first network device 20 may disambiguate the route entries for tunnel routes of different protocols such that first network device 20 may install tunnel routes for various different protocols within the resolution tree. For example, if an RSVP route is colored red (0) and an LDP route is colored blue (1), then routes in the RIB inetcolor.0 would be for the prefixes C-0 and C-1. These two routes are different prefixes and thus, each route is a candidate for being looked-up in a resolution tree built out of inetcolor.0 using the appropriate key as C-0 or C-1.

Service mapping, as described herein, has several aspects: tunnel coloring, service route coloring, resolution over the color RIB, and color hierarchy. Tunnel coloring is the coloring of tunnels to disambiguate the per-tunnel routes on a per tunnel-type basis. Service route coloring is the coloring of service routes so that when requesting route resolution, the protocol-nexthop and the color are both used as an input. Resolution over the color RIB refers to asking the resolver to resolve an "endpoint-address, color" pair. Color-hierarchy allows the creation of inter-relationships between colors so as to offer primary and fallback relationships between tunnels of various attributes. Each of these aspects is described in more detail below.

Tunnel coloring can be done using static configuration for tunnels that have per-tunnel configuration at the ingress router, e.g., RSVP-TE, static SRTE, or static LSP. For tunnels that are dynamically learned, tunnel coloring may be performed using a policy on a tunnel ingress, e.g., for LDP, or tunnel coloring may be performed on a tunnel egress using a policy and signaling the color using a tunnel-encapsulation attribute. The tunnel-encapsulation attribute may be, for example, BGP SR-TE or BGP-LU.

Service routes can be colored either on a tunnel ingress or on a tunnel egress by using a policy. A Controller 10 may signal a service color using an extended color community that is attached to the NLRI.

Resolution over the color RIB refers to asking the resolver to resolve an "endpoint-address, color" pair. The concept of service policies is generalized from BGP SR-TE to allow service policies to be usable for various types of tunnels (whether currently available, as well as future tunnel types that have not yet been implemented. The solution described herein is therefore agnostic to tunnel-type and service-type.

Tunnels that a user wishes to use for service-mapping are be colored with a number. A tunnel may be colored with multiple colors. Tunnels over which a user wishes to load-balance traffic associated with a network service is assigned a tunnel color that is the same as a service color of the network service. Network device 20 installs each tunnel in inet.3 as is performed conventionally. Thus, network device 20 may perform resolution for uncolored service routes. Network device 20 may install additional routes for colored tunnels. Specifically, network device 20 may install routes in inetcolor.0 (or in inet6color.0 for IPv6 tunnels):

<color, tunnel-endpoint> for each color assigned to the tunnel

<color, all-0s> for each color assigned to the tunnel

Tunnels may be colored in different ways. For example, a tunnel may be assigned a static color configuration on a ingress of the tunnel. As another example, the tunnel may signal color information from an egress of the tunnel using BGP. For BGP SR-TE tunnels, the tunnel may use SR Policy SAFI and NLRI to signal color information. For other types of tunnels, the tunnel may use, e.g., VXLAN, GRE, MPLS-in-GRE, etc. to signal color information. Typically, a network operator coordinates tunnel color for their specific network needs.

As an illustration of the above, an RSVP tunnel comprising an IP address endpoint of 128.1.1.23 is colored with color 10. Network device 20 installs the following routes for the RSVP tunnel:

in inetcolor.0:

<10-128.1.1.23>164

<10-0.0.0.0>164 in inet.3:

128.1.1.23/32

Network device 20 may install similar routes for tunnels of other types.

The following code may illustrate an example configuration for tunnels of type RSVP, static-LSP, LDP, RSVP-automesh, GRE, or UDP:

```
protocols {
        mpls {
            label-switched-path ct-vpn1 {...
+               color 10;
                ...
            }
            label-switched-path ct-core {...
+               color 20;
                ...
            }
            label-switched-path foo {
                template;
+               color 30;
            }
            static-label-switched-path lsp {
                ingress {...
+               color 25;
                    ...
                }
            }
        }
        ldp {
```

-continued

```
+               color-import-policy ldp-tunnel-color;
        }
}
dynamic-tunnels {
        abc {
            rsvp-te abc {
                label-switched-path-template {
                    foo;
                }
                destination-networks {
                    10.1.0.0/8;
                }
+           color 40;
            }
        }
        def {
            source-address 1.2.3.4;
            gre;
            destination-networks {
                10.2.0.0/16;
            }
+           color 45;
        }
        pqr {
            source-address 1.2.3.4;
            udp;
            destination-networks {
                10.3.0.0/16;
            }
+           color 50;
        }
}
## Policy to color LDP FEC routes
policy-options {
        policy-statement ldp-tunnel-color {
            term ldp-color {
                from {
                    protocol ldp;
                    route-filter 10.10.2.5/32 exact; # if per-egress color-
                    ing is desired, else route-filter can be omitted
                }
                then {
                    color 60;
                    accept;
                }
            }
        }
}
```

Applying group config helps to color multiple tunnels using a single regular-expression. The following code may illustrate an example of easing tunnel-coloring:

```
groups {
        rsvp-colors {
            protocols {
                mpls {
                    label-switched-path <LSP_A_TO_B_VIA_C*> {
                        color 101;
                    }
                    label-switched-path <LSP_A_TO_B_VIA_D*> {
                        color 102;
                    }
                }
            }
        }
}
protocols {
        apply-groups rsvp-colors;
        mpls {
            label-switched-path LSP_A_TO_B_VIA_Z_1 {...
                ## uncolored RSVP tunnel
                ...
```

-continued

```
        }
        label-switched-path LSP_A_TO_B_VIA_C_1 {...
            ## 'color' was inherited from group 'rsvp-colors'
+           color 101;
            ...
        }
        label-switched-path LSP_A_TO_B_VIA_C_2 {...
            ## 'color' was inherited from group 'rsvp-colors'
+           color 101;
            ...
        }
        label-switched-path LSP_A_TO_B_VIA_C_3 {...
            ## 'color' was inherited from group 'rsvp-colors'
+           color 101;
            ...
        }
        label-switched-path LSP_A_TO_B_VIA_D_1 {...
            ## 'color' was inherited from group 'rsvp-colors'
+           color 102;
            ...
        }
        label-switched-path LSP_A_TO_B_VIA_D_2 {...
            ## 'color' was inherited from group 'rsvp-colors'
+           color 102;
            ...
        }
        label-switched-path LSP_A_TO_B_VIA_D_3 {...
+           color 102;
            ...
        }
    }
}
```

Service routes for which a specific service mapping is defined are marked with a color. A colored service route is marked only with one color. Service routes that are not marked with a color may be mapped to a tunnel/IP prefix as per default behavior. Color on a service route is an attribute of the route and is not required to be included in the protocol next hop for which resolution is requested. When requesting resolution, the service-route passes the following types of information:

Protocol Next Hop (e.g., an IP endpoint address); and

Resolution type.

As examples, the type of resolution (e.g., a tunnel type) may include one or more of the following in various orders:

IP-Color: resolution occurs over a tunnel (or tunnel set) to a specific endpoint with a specific color.

Any-color: resolution occurs over a tunnel (or tunnel set) to specific endpoint of any color, regardless of the IP endpoint address.

Non-tunnel: resolution occurs over any inet.0 route.

Color-only: resolution occurs over any tunnel (or tunnel set) of a specific color.

Network device 20 may resolve tunnels of type *-other-ip-af in the relevant resolution tree in a similar fashion. The above types of resolution may device a fallback intent for each service route.

Example code is provided for an example configuration of a resolution map. The entire case-space of acceptable resolution fallbacks may be discernible by excluding cases described as unacceptable fallback orders. Types of tunnels, such as color, any-color, color-only, non-tunnel and *-other-ip-af may appear in any order as long as they occur only once in a specific colormap.

```
policy-options {
    resolution-map my-map {
        #ordering of following knobs determines order of
            resolution-fallbacks
            color;
            any-color;
            non-tunnel;
            color-only;
            color-other-ip-af;
            any-color-other-ip-af;
            non-tunnel-other-ip-af;
            color-only-other-ip-af;
    }
    #default behavior: in the absence of resolution-map:
    #For colored service routes: is "any-color"
    #For uncolored service routes: is as per whatever
        resolution-tree that the app picked
    policy-statement ac {
        term coloring {
            from {
                . . . #<whatever match criteria>
            }
            then {
+ resolution my-map;
    accept;
            }
        }
    }
}
```

The example configuration provided above may set forth flexible levels of fallback orders. However, some combinations do not make sense, and in some examples, a user may be prohibited from configuring such combinations. In some examples, the following assumptions may be made to enforce acceptable configurations for a given IP family. For example, it is meaningless to resolve over a "non-tunnel" type and have a fallback mapping mode to resolve over a tunnel (e.g., some ordering of tunnel type of color, any-color, or color-only) of the same IP address family. As a further example, specifying a "color" tunnel type as lower priority than an "any-color" tunnel type does not make sense because if an "any-color" tunnel cannot be resolved, a tunnel of a specific color could not be resolved. As another example, one may not specify a "color-only" tunnel type and fallback to a "color" type. As another example, not listing a "color" type means that "color-only" is not desired.

As an example of the above, service route resolution may be performed using single resolution from a service and/or application. Such resolution may occur over appropriate RIB(s) as per user-intent. Network device 20 may resolve a service to a service route based on a received protocol next hop. In some examples, the protocol next hop is an IP address prefix. Where a service requests resolution of a protocol next hop of an address family other than IPv4 or IPv6 (e.g., a colored-IPv4 or IPv6 family), network device 20 may treat only the IPv4/IPv6 address prefix of the protocol next hop as a protocol next hop input into the resolution-shim layer.

The following discussion illustrates how network device 20 may receive forwarding information for the service routes from the resolver. This serves as the underpinning for the "resolution fallbacks" performed by network device 20.

There are several approaches to performing service route resolution. For example, service resolution may be performed via multi-resolution from the shim layer. As another example, service resolution may be performed via uni-resolution with a per-fallback resolution tree built from a single RIB of network device 20. Each of these approaches uses a shim-layer. The shim-layer provides different functionality in each of the foregoing approaches. The use of the uni-resolution approach may provide advantages over the use of the multi-resolution approach.

With respect to multi-resolution, each service route may include a fallback intent obtained from the resolution map. When a service route requests resolution, a shim layer between the application and the resolver multiplies the resolution request into multiple resolution requests, e.g., the resolver sets one request for each of the resolution levels in the resolution map. Based on the specific resolution level, the shim layer creates a resolution request by setting a shim protocol next hop for the resolver, picks a resolution tree, and, for levels other than the highest level in the resolution map, internally creates a new rt_entry.

The preference associated with the multiple service route entries are corresponding in numerically increasing order for the resolution levels from top to below. These can be set using rtm_preference4. The shim layer is stateless. The rt_entries that are passed through include all of the state data. The rt_entries include some marking to indicate the corresponding level in the resolution map.

Events from the application include a resolution request, e.g., resolving adding a routing table next hop, protocol next hop, resolution tree, application callback, and resolution map encoding. Events within the shim layer may be based on the resolution map encoding to translate resolving adding a routing table next hop into multiple requests. Events from the resolution may include resolution callbacks to the shim layer from the resolver.

The shim-layer-callback( ) routine1 looks up rt_entries( ) matching the route and calls app-callback( ) only if this shim-layer-callback( ) was called for the best-preference resolved rt_entry for this prefix. If so, the routine lets the application execute its own callback by calling app-callback( ) (from shim-layer-callback( )). For the lower preference rt_entries( ) this routine internally does a rt_change( ) When the last of rt_entry's for this prefix (with resolution level marked on it) becomes unresolved, the routine calls app-callback( ). With respect to fallback and reversion, when a higher level route_entry is resolved, the route-install logic in rpd automatically updates a route in the kernel of network device 20 with the highest resolution level's next hop.

The multi-resolution scheme may suffer from various drawbacks. For example, this scheme creates additional service route entries when the application invokes resolution fallbacks. Further, this scheme does not provide packet forwarding engine (PFE) fast re-routing (FRR) among the resolution levels. However, this scheme may function without changes to the resolver.

The operation of uni-resolution (from the shim layer) with a per-fallback single-RIB resolution tree is similar to the operation of BGP rt_multipath. For example, where network device 20 learns an L3VPN prefix "A" from two remote PE devices, network device 20 creates a Unilist of indirect next hops. For this to happen, the service passes rt_nexthops_template with multiple gateways corresponding to the IP protocol next hops of the two Pe devices. However, in some examples, a single resolution-tree is passed. To meet the fallbacks requirement, this mechanism is used to create a weighted unilist of indirect next hops and pass a resolution tree for every gateway associated with the per-gateway protocol next hop in the nh-template.

To pass separate resolution trees in the template, e.g., one per gateway, the resolver may merge the results of the multiple resolutions. However, the multiple resolutions are received from different resolution trees. Each of the resolution trees used from the shim layer comprises routes from a single RIB.

The shim layer is described next. Each service route has an attached fallback intent, which is obtained from the resolution map. The shim layer translates fallback intent into a form that the resolver may process. In other words, the received fallback-intent is an attribute of the route that the shim layer translates into a suitable update on the template being used to request resolution.

When a service route requests resolution using an IP-family protocol next hop, a shim layer between the application and the resolver populates fields into a template for next hops for as many gateways as the number of fallbacks requested. For example, the shim layer populates, into each gateway, a resolution tree and a shim-protocol next hop. The resolution tree is looked up appropriately for the fallback. The shim-protocol next hop is created from the received protocol next hop by converting it for use in the resolution tree.

Examples of resolution trees that may exist in a given routing instance are listed below. These trees are flexible such that they may be sufficient to meet various types of resolution requests for service mapping. For example resolution trees as described herein may include one or more of the following:

RESO_INET of inet.0 (made only of inet.0 routes and not inet.3 routes): use for "non-tunnel."

RESO_INET of inet.3: used for "any-color."

RESO_INETCOLOR of inetcolor.0: used for "color" and "color-only" with protocol next hops <color, endpoint> and <color, all-0s> respectively.

RESO_INET6 of inet6.0 (made only of inet.0 routes and not inet.3 routes): use for the IPv6 version of "non-tunnel."

RESO_INET6 of inet6.3: used for IPv6 version of "any-color."

RESO_INET6COLOR of inet6color.0: used for IPv6 version of "color" and "color-only" with protocol next hops <color, endpoint> and <color, all-0s> respectively.

In the foregoing example, the resolution trees are made only from the routes of the RIB in question. This is done to support fallbacks in any order without the need to create a much larger number of resolution trees for every possible combination of fallbacks that may be in use at the same time for different service routes. Therefore, only RIBs whose routes may be used for resolving other routes have an associated resolution tree. Every such RIB has only one associated resolution tree and its RESO_AF corresponds to the address family of that RIB.

The shim layer described herein is stateless. Depending on the number and order of fallbacks desired, this shim layer creates the relevant rt_nexthops_template and passes the template to the resolver. Upon the resolution succeeding, changing, or failing, the resolver calls the callback of the corresponding application. Where multiple resolution fallbacks are available, the resolver returns a weighted unilistNH for use by the application or service.

With respect to fallback and reversion, because the resolver is returning a weighted unilistNH, the failure of the least-weighted leg in the unilistNH automatically provides failure protection and subsequent listNH modification from rpd. Where a higher level fallback subsequently becomes available, re-resolution automatically creates a unistlistNH with additional NH leg(s) and thus may provide reversion.

Considering that each fallback level encodes its own resolution tree protocol next hop, the techniques of the disclosure do not require that a failing walk of a resolution tree for a particular color results in a lookup of a color-only route when the color route is not present. Therefore, there is not a need to encode a colored prefix as <endpoint, color>.

In fact, encoding the prefix as <color, endpoint> frees the resolver from having to meet the special resolver requirements of the disclosure, e.g., to consider a “color” as a resolution criterion in addition to the default use of an “endpoint” as a resolution criterion.

As an illustration of the foregoing, if an address family of a protocol next hop is IPv4, then the following types may map to a single resolution tree:

color: inetcolor.0;
any-color: inet.3;
non-tunnel: inet.0; and
color-only: inetcolor.0.

As another illustration, if an address family of a protocol next hop is IPv6, then the following types may map to a single resolution tree:

color: inet6color.0;
any-color: inet6.3;
non-tunnel: inet6.0; and
color-only: inetcolor.0.

As another example, consider an example service route comprising an IP address prefix of 1.2.3.4/32, comprising a color of “10” and an IP protocol of 128.1.1.23. A user may define resolution according to a resolution map comprising an order of color; any-color; color-only, and non-tunnel. The network device may create a single resolution request with multiple gateways (e.g., in a nh_template), each gateway comprising a resolution tree and a protocol next hop, as follows:

1. Resolution for <10-128.1.1.23> in the resolution-tree built solely from inetcolor.0 (RESO_INETCOLOR family);
2. Resolution for <128.1.1.23> in the resolution-tree built solely from inet.3 (RESO_INET family);
3. Resolution for <10-0.0.0.0> in the resolution-tree built solely from inetcolor.0 (RESO_INETCOLOR family); and
4. Resolution for <128.1.1.23> in the resolution-tree built solely from inet.0 (RESO_INET family).

In summary, the use of uni-resolution as described above may provide several advantages over the use of multi-resolution. For example, the uni-resolution scheme does not create additional service route entries when the application desires resolution fallbacks. Further, the uni-resolution scheme allows for the use of PFE FRR. The uni-resolution scheme additionally creates a minimal number of resolution trees. This number of resolution trees is unaffected by the number of combinations of fallbacks that are in use across the routing instance. However, the uni-resolution scheme may require resolver changes. For example, the uni-resolution scheme may require support for resolution over fixed-length routes. Further, for certain use cases, the uni-resolution scheme may require support for resolution over variable-length IP prefixes. In some examples, the uni-resolution scheme optionally may require support for matching over fixed length color.

With respect to encoding the service resolution, the next hop topologies described herein are created with consideration to the application route, the selected tunnel set, the semantics of the use of the chosen tunnel set (e.g., load-balance, primary-fallback, traffic-class-based usage, etc.), and the platform on which service-mapping is being performed. Additional next hop topologies may be needed to support specific <tunnel-type, service-type> tuples, the implementation of which is not relevant to the techniques of the disclosure set forth herein.

Examples of basic tunnel set picking are set forth herein. Example types for mapping traffic for a specific service route onto a specific type of tunnel (e.g., a single tunnel) are provided. In this example, a SPRING-TE tunnel is colored, using a command line interface (CLI), with color 5. A first RSVP-TE tunnel, ct-vpn1, is colored with color 100 and a second RSVP-TE tunnel, ct-vpn2, is colored with color 200. In this example, service routes may include, e.g., Inet BGP routes or Inet-vpn BGP routes. A user may specify, using the aforementioned techniques, that VPN1 routes go over color 100, VPN2 routes go over color 200, and network traffic with IP address prefix 10.10.1.5 (e.g., in inet.0) go over color 5.

The following configuration may illustrate the foregoing example:

regress@D> show mpls lsp
Ingress LSP: 6 sessions
To From State Rt P ActivePath LSPname
128.49.80.207 128.49.80.219 Up 0 ct-vpn1
128.49.80.207 128.49.80.219 Up 0 ct-vpn2
Total 2 displayed, Up 2, Down 0
regress@D> show route table inetcolor.0
inetcolor.0: 7 destinations, 7 routes (7 active, 0 holddown, 0 hidden)+
=Active Route, −=Last Active, *=Both
0.0.0.0-5<c>/64
*[SERVICE-MAPPING/3] 00:14:02, metric 1, metric2 1
>to 10.5.5.1 via ge-0/0/5.0, Push 100010, Push 100000, Push 200001(top) 0.0.0.0-100<c>/64
*[SERVICE-MAPPING/3] 00:13:02, metric 2
>to 10.6.6.3 via ge-0/0/6.0, label-switched-path ct-vpn1 0.0.0.0-200<c>/64
*[SERVICE-MAPPING/3] 00:13:03, metric 2
>to 10.5.5.2 via ge-0/0/5.0, label-switched-path ct-vpn2 128.49.80.207-0<c>/32
*[SERVICE-MAPPING/3] 00:14:02, metric 1, metric2 1
>to 10.5.5.1 via ge-0/0/5.0, Push 100010, Push 100000, Push 200001(top)
>to 10.6.6.3 via ge-0/0/6.0, label-switched-path ct-vpn1
>to 10.5.5.2 via ge-0/0/5.0, label-switched-path ct-vpn2 128.49.80.207-5<c>/64
*[SERVICE-MAPPING/3] 00:14:02, metric 1, metric2 1
>to 10.5.5.1 via ge-0/0/5.0, Push 100010, Push 100000, Push 200001(top) 128.49.80.207-100<c>/64
*[SERVICE-MAPPING/3] 00:13:02, metric 2
>to 10.6.6.3 via ge-0/0/6.0, label-switched-path ct-vpn1 128.49.80.207-200<c>/64
*[SERVICE-MAPPING/3] 00:13:03, metric 2
>to 10.5.5.2 via ge-0/0/5.0, label-switched-path ct-vpn2
regress@D> show route protocol bgp
inet.0: 26 destinations, 26 routes (25 active, 0 holddown, 1 hidden)
+=Active Route, −=Last Active, *=Both
10.10.1.5/32 *[BGP/170] 00:08:38, localpref 100, from 128.49.80.207
AS path: I, validation-state: unverified
>to 10.5.5.1 via ge-0/0/5.0, Push 100010, Push 100000, Push 200001(top)
1.inet.0: 5 destinations, 5 routes (5 active, 0 holddown, 0 hidden)
+=Active Route, −=Last Active, *=Both 10.11.1.1/32 *[BGP/170] 00:08:36, localpref 100, from 128.49.80.207
AS path: I, validation-state: unverified
>to 10.6.6.3 via ge-0/0/6.0, label-switched-path ct-vpn1
10.99.1.10/32 *[BGP/170] 00:08:36, localpref 100, from 128.49.80.207
AS path: I, validation-state: unverified
>to 10.6.6.3 via ge-0/0/6.0, label-switched-path ct-vpn1
2.inet.0: 3 destinations, 3 routes (3 active, 0 holddown, 0 hidden)
+=Active Route, −=Last Active, *=Both
10.22.1.1/32 *[BGP/170] 00:08:36, localpref 100, from 128.49.80.207
AS path: I, validation-state: unverified
>to 10.5.5.2 via ge-0/0/5.0, label-switched-path ct-vpn2
10.99.2.10/32 *[BGP/170] 00:08:36, localpref 100, from 128.49.80.207
AS path: I, validation-state: unverified
>to 10.5.5.2 via ge-0/0/5.0, label-switched-path ct-vpn2

Another example is set forth for mapping traffic for a single service route to be load-balanced over multiple tunnels. Multiple tunnels that are colored with the same color may install their next hops as legs of a unilistNH under the same route representing the tunnel. In this example, a SPRING-TE tunnel is colored with color 5. A first RSVP-TE tunnel, ct-1, is colored with color 5 and a second RSVP-TE tunnel, ct-2, is colored with color 100. In this example, the RSVP-TE tunnels are configured using prpd to mark color. A service route comprises Inet-vpn BGP routes. A user may specify, using the aforementioned techniques, that VPN 1 routes go over color 5, e.g., to load balance network traffic for the VPN 1 network service across SPRING-TE and RSVP LSP ct-1 tunnels.

The following configuration may illustrate the foregoing example:

regress@D> show mpls lsp
Ingress LSP: 6 sessions
To From State Rt P ActivePath LSPname
128.49.80.207 128.49.80.219 Up 0 ct-1
128.49.80.207 128.49.80.219 Up 0 ct-2
Total 2 displayed, Up 2, Down 0
regress@D> show route table inetcolor.0
inetcolor.0: 5 destinations, 5 routes (5 active, 0 holddown, 0 hidden)
+=Active Route, −=Last Active, *=Both
0.0.0.0-5/64
*[SERVICE-MAPPING/3] 00:14:02, metric 1, metric2 1
>to 10.5.5.1 via ge-0/0/5.0, Push 100010, Push 100000, Push 200001(top)
>to 10.6.6.3 via ge-0/0/6.0, label-switched-path ct-1
0.0.0.0-100<c>/64
*[SERVICE-MAPPING/3] 00:13:02, metric 2
>to 10.6.6.3 via ge-0/0/6.0, label-switched-path ct-2
128.49.80.207-0<c>/32
*[SERVICE-MAPPING/3] 00:14:02, metric 1, metric2 1
>to 10.5.5.1 via ge-0/0/5.0, Push 100010, Push 100000, Push 200001(top)
>to 10.6.6.3 via ge-0/0/6.0, label-switched-path ct-1
>to 10.6.6.3 via ge-0/0/6.0, label-switched-path ct-2
128.49.80.207-5<c>/64
*[SERVICE-MAPPING/3] 00:14:02, metric 1, metric2 1
>to 10.5.5.1 via ge-0/0/5.0, Push 100010, Push 100000, Push 200001(top)
>to 10.6.6.3 via ge-0/0/6.0, label-switched-path ct-1
128.49.80.207-100<c>/64
*[SERVICE-MAPPING/3] 00:13:02, metric 2
>to 10.6.6.3 via ge-0/0/6.0, label-switched-path ct-2
regress@D> show route protocol bgp
1.inet.0: 5 destinations, 5 routes (5 active, 0 holddown, 0 hidden)
+=Active Route, −=Last Active, *=Both
10.11.1.1/32 *[BGP/170] 00:08:36, localpref 100, from 128.49.80.207
AS path: I, validation-state: unverified
>to 10.6.6.3 via ge-0/0/6.0, label-switched-path ct-1
>to 10.5.5.1 via ge-0/0/5.0, Push 100010, Push 100000, Push 200001(top)
10.99.1.10/32 *[BGP/170] 00:08:36, localpref 100, from 128.49.80.207
AS path: I, validation-state: unverified
>to 10.6.6.3 via ge-0/0/6.0, label-switched-path ct-1
>to 10.5.5.1 via ge-0/0/5.0, Push 100010, Push 100000, Push 200001(top)

Examples of mapping modes comprising primary and fallback mapping modes are set forth below. As a first example of traffic fallback, an example is described for mapping traffic for a single service route to be carried over a specific tunnel (or tunnel set), and if the tunnel fails, to carry the traffic over another tunnel (or tunnel set). In this example, the network includes 2 tunnel sets: tunnel set A, configured with tunnel color 100; and tunnel set B, configured with tunnel color 200.

With respect to the foregoing example, service routes intended to be mapped to tunnel set A, with no traffic-fallback, are colored with service color 100. Service routes intended to be mapped to tunnel set B with no traffic fallback are colored with service color 200. Service routes intended to be mapped to tunnel set A, and if tunnel set A fails, to be mapped over tunnel set B, are colored with service color 300. Furthermore, service routes intended to be mapped to tunnel set C and tunnel set D so as to load balance traffic in a ratio of 20:80 (over tunnel sets C and D, respectively) are colored with service color 600, where tunnel set C and tunnel set D are colored with tunnel colors 400 and 500, respectively.

The following example code may illustrate the foregoing example:

```
routing-options {
  color-hierarchy {
  #Tunnels colored 100 carry traffic, if they fail, then tunnels colored 200 carry
  #the traffic
    color 300 {
      color 100 {
        primary;
      }
      color 200 {
        fallback;
      }
    }
    #"Balance" provides semantic of weighted-ECMP
    color 600 {
      color 100 {
        balance 20;
```

```
        }
        color 200 {
            balance 80;
        }
    }
  }
}
```

The foregoing example code creates the following new routes in inet(6)color.0:

```
<tunnel-endpoint, 300>
<all-0s, 300>
<tunnel-endpoint, 600>
<all-0s, 600>
```

As another illustration, a network includes 2 RSVP-TE colored tunnels ct-1 and ct-2, which are marked with tunnel colors 100 and 200, respectively. Service routes include Inet BGP routes and Inet-vpn BGP routes. In accordance with the techniques set forth above, a user may define a tunnel fallback scheme as follows. Network traffic associated VPN 1 routes go over tunnels of color 100 using only the ct-1 LSP. Network traffic associated with an IP address prefix of 10.10.1.5 (in inet.0) go over tunnels of color 300 first using ct-1 LSP, and if the ct-1 LSP tunnel is not available, using ct-2 LSP. Network traffic associated with an IP address prefix of 10.10.1.55 (in inet.0) go over tunnels of color 600 and are load-balanced across ct-1 LSP ct-2 LSP in traffic-proportion 20/80.

The following configuration may illustrate the foregoing example:

```
regress@D> show mpls lsp
Ingress LSP: 6 sessions
To From State Rt P ActivePath LSPname
128.49.80.207 128.49.80.219 Up 0 ct-1
128.49.80.207 128.49.80.219 Up 0 ct-2
Total 2 displayed, Up 2, Down 0
regress@D> show route table inetcolor.0
inetcolor.0: 4 destinations, 4 routes (4 active, 0 holddown,
  0 hidden)
+=Active Route, -=Last Active, *=Both
0.0.0.0-100<c>/64
  *[SERVICE-MAPPING/3] 00:13:02, metric 2
  >to 10.6.6.3 via ge-0/0/6.0, label-switched-path ct-1
0.0.0.0-200<c>/64
  *[SERVICE-MAPPING/3] 00:13:03, metric 2
  >to 10.5.5.2 via ge-0/0/5.0, label-switched-path ct-2
0.0.0.0-300<c>/64
  *[SERVICE-MAPPING/3] 00:13:03, metric 2
  >to 10.6.6.3 via ge-0/0/6.0, label-switched-path ct-1,
    weight: 0x1
  >to 10.5.5.2 via ge-0/0/5.0, label-switched-path ct-2,
    weight: 0x8001
0.0.0.0-600<c>/64
  *[SERVICE-MAPPING/3] 00:13:03, metric 2
  >to 10.6.6.3 via ge-0/0/6.0, label-switched-path ct-1,
    weight: 0x1, balance: 20
  >to 10.5.5.2 via ge-0/0/5.0, label-switched-path ct-2,
    weight: 0x1, balance: 80
128.49.80.207-0<c>/32
  *[SERVICE-MAPPING/3] 00:14:02, metric 1, metric2
    1
  >to 10.6.6.3 via ge-0/0/6.0, label-switched-path ct-1
  >to 10.5.5.2 via ge-0/0/5.0, label-switched-path ct-2
128.49.80.207-100<c>/64
  *[SERVICE-MAPPING/3] 00:13:02, metric 2
  >to 10.6.6.3 via ge-0/0/6.0, label-switched-path ct-1
128.49.80.207-200<c>/64
  *[SERVICE-MAPPING/3] 00:13:03, metric 2
  >to 10.5.5.2 via ge-0/0/5.0, label-switched-path ct-2
  128.49.80.207-300<c>/64
*[SERVICE-MAPPING/3] 00:13:03, metric 2
  >to 10.6.6.3 via ge-0/0/6.0, label-switched-path ct-1,
    weight: 0x1
  >to 10.5.5.2 via ge-0/0/5.0, label-switched-path ct-2,
    weight: 0x8001
128.49.80.207-600<c>/64
  *[SERVICE-MAPPING/3] 00:13:03, metric 2
  >to 10.6.6.3 via ge-0/0/6.0, label-switched-path ct-1,
    weight: 0x1, balance: 20
  >to 10.5.5.2 via ge-0/0/5.0, label-switched-path ct-2,
    weight: 0x1, balance: 80
regress@D> show route protocol bgp
inet.0: 26 destinations, 26 routes (25 active, 0 holddown,
  1 hidden)
+=Active Route, -=Last Active, *=Both
10.10.1.5/32 *[BGP/170] 00:08:38, localpref 100, from
  128.49.80.207
  AS path: I, validation-state: unverified
  >to 10.6.6.3 via ge-0/0/6.0, label-switched-path ct-1,
    weight: 0x1
  >to 10.5.5.2 via ge-0/0/5.0, label-switched-path ct-2,
    weight: 0x8001
10.10.1.55/32 *[BGP/170] 00:08:38, localpref 100, from
  128.49.80.207
  AS path: I, validation-state: unverified
  >to 10.6.6.3 via ge-0/0/6.0, label-switched-path ct-1,
    weight: 0x1, balance: 20
  >to 10.5.5.2 via ge-0/0/5.0, label-switched-path ct-2,
    weight: 0x1, balance: 80
1.inet.0: 5 destinations, 5 routes (5 active, 0 holddown, 0
  hidden)
+=Active Route, -=Last Active, *=Both
10.11.1.1/32 *[BGP/170] 00:08:36, localpref 100, from
  128.49.80.207
  AS path: I, validation-state: unverified
  >to 10.6.6.3 via ge-0/0/6.0, label-switched-path ct-1
10.99.1.10/32 *[BGP/170] 00:08:36, localpref 100, from
  128.49.80.207
  AS path: I, validation-state: unverified
  >to 10.6.6.3 via ge-0/0/6.0, label-switched-path ct-1
2.inet.0: 3 destinations, 3 routes (3 active, 0 holddown, 0
  hidden)
+=Active Route, -=Last Active, *=Both
10.22.1.1/32 *[BGP/170] 00:08:36, localpref 100, from
  128.49.80.207
  AS path: I, validation-state: unverified
  >to 10.5.5.2 via ge-0/0/5.0, label-switched-path ct-2
10.99.2.10/32 *[BGP/170] 00:08:36, localpref 100, from
  128.49.80.207
  AS path: I, validation-state: unverified
  >to 10.5.5.2 via ge-0/0/5.0, label-switched-path ct-2
```

Figure 5:
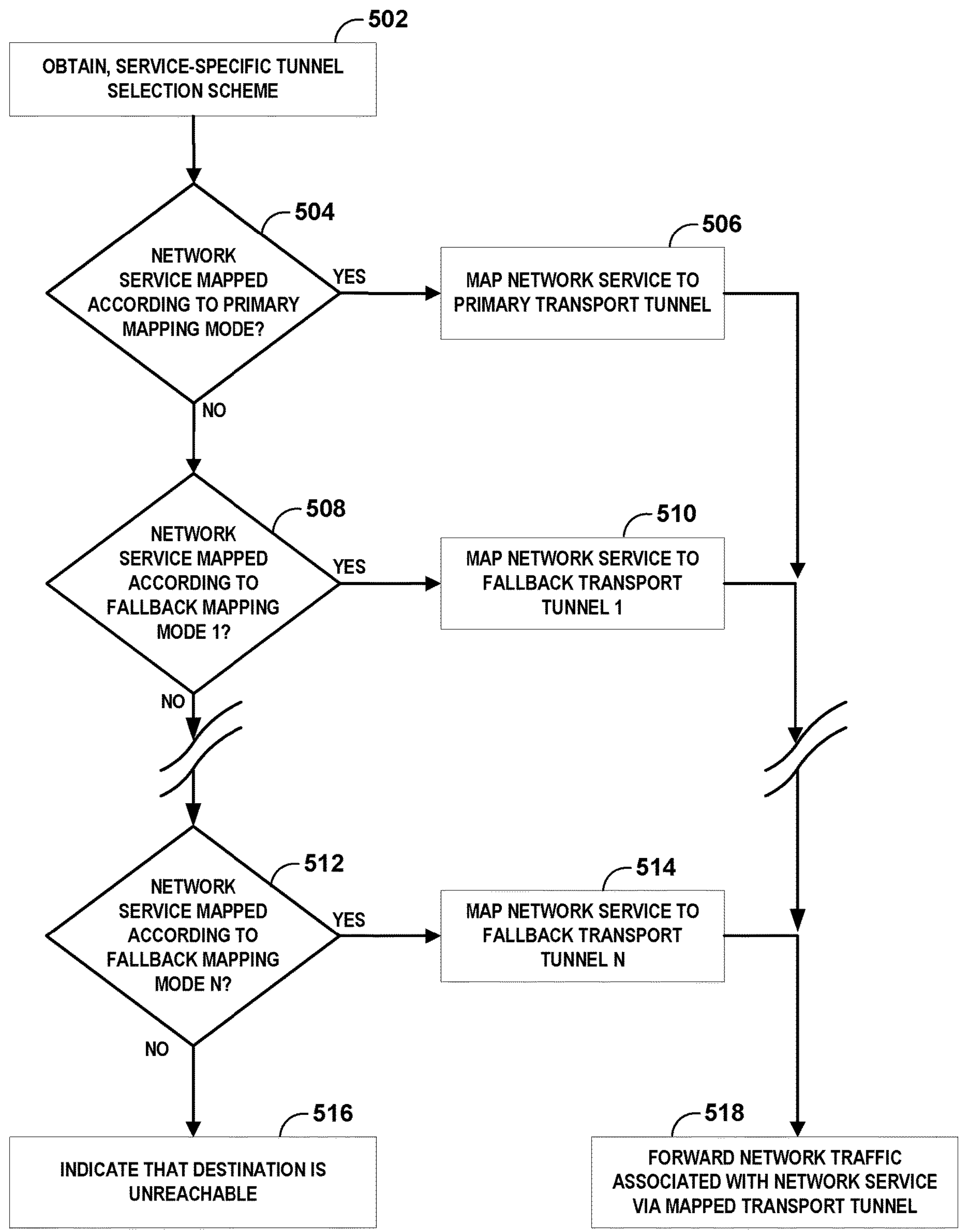
FIG. 5 is a flowchart illustrating an example operation in accordance with the techniques of the disclosure.

FIG. 5 is a flowchart illustrating an example operation in accordance with the techniques of the disclosure. Specifically, FIG. 5 illustrates an operation for using a service-based tunnel selection scheme to map a network service to one or more fallback transport tunnels for forwarding network traffic associated with the network service when a network device is unable to map the network service to a primary transport tunnel. For convenience, the operation of FIG. 5 is described with respect to network device 50 of FIG. 2. However, other network devices may also perform the operation of FIG. 5, such as network devices 20 and 30 of FIG. 1.

As depicted in the example of FIG. 5, control unit 70 of network device 50 obtains service-specific tunnel selection scheme 86 (502). In some examples, control unit 70 receives, from controller 10 of FIG. 1, a plurality of tunnel selection schemes, each tunnel selection scheme corresponding to a different network service of a plurality of network services, and stores the received plurality of tunnel selection schemes in memory 84. In some examples, control unit 70 receives tunnel selection scheme 86 from controller 10 via an exterior gateway protocol message. In some examples, the exterior gateway protocol message is a BGP update message.

Control unit 70 receives, via IFCs 60, network traffic associated with a network service, the network traffic comprising one or more packets. Control unit 70 receives, from controller 10, an exterior gateway protocol message specifying one or more service parameters (e.g., a service color or service type) of the network service associated with the network traffic. Further, control unit 70 receives, from controller 10, an exterior gateway protocol message specifying one or more attributes (e.g., tunnel color) associated with one or more tunnels. For example, where network device 50 is an example of network device 20 of FIG. 1, network device 50 receives an exterior gateway protocol message specifying one or more attributes associated with each of tunnels 42, 44, 46 of FIG. 1. Control unit 70 may use the exterior gateway protocol message specifying the one or more service parameters to retrieve, from memory 84, a tunnel selection scheme 86 corresponding to the network service associated with the network traffic.

Tunnel selection scheme 86 specifies a primary mapping mode for mapping a corresponding network service to a primary transport tunnel of one or more tunnels (e.g., tunnels 42, 44, 46 of FIG. 1). For example, the primary mapping mode of tunnel selection scheme 86 specifies tunnel 42A as the primary transport tunnel. Further, tunnel selection scheme 86 specifies at least one fallback mapping mode for mapping the network service to at least one fallback transport tunnel of the one or more tunnels. In the example of FIG. 5, tunnel selection scheme 86 specifies "N" fallback mapping modes, wherein N is any number. For example, a first fallback mapping mode of tunnel selection scheme 86 designates tunnel 44A as a first fallback transport tunnel. A second fallback mapping mode of tunnel selection scheme 86 may designate tunnel 44B as a second fallback transport tunnel, and so on, until an "Nth" fallback mapping mode of tunnel selection scheme 86 designates tunnel 46N as an "Nth" fallback transport tunnel. The service-specific tunnel selection scheme may specify a plurality of fallback mapping modes such that, if the first fallback mapping mode also fails, network device 50 may continue to try numerous fallback mapping modes until a reachable tunnel is found for transporting the network traffic associated with the network service.

Control unit 70 of network device 50 determines whether the network service can be mapped according to the primary mapping mode specified by tunnel selection scheme 86 (504). In response to determining that the network service can be mapped according to the primary mapping mode (e.g., "YES" block of 504), control unit 70 maps the network service to primary transport tunnel 42A (506) and forwards the network traffic associated with the network service via the mapped transport tunnel (518).

In response to determining that the network service cannot be mapped to the primary mapping mode (e.g., "NO" block of 504), control unit 70 determines whether the network service can be mapped according to the first fallback mapping mode specified by tunnel selection scheme 86 (508). In response to determining that the network service can be mapped according to the first fallback mapping mode (e.g., "YES" block of 508), control unit 70 maps the network service to first fallback transport tunnel 44A (510) and forwards the network traffic associated with the network service via the mapped transport tunnel (518).

In response to determining that the network service cannot be mapped to the first fallback mapping mode (e.g., "NO" block of 508), control unit 70 may continue to try numerous fallback mapping modes until a reachable tunnel is found for transporting the network traffic associated with the network service. For example, control unit 70 may continue to try numerous fallback mapping modes in the fashion described above until control unit 70 determines whether the network service can be mapped according to the "Nth" fallback mapping mode specified by tunnel selection scheme 86 (512). In response to determining that the network service can be mapped according to the "Nth" fallback mapping mode (e.g., "YES" block of 512), control unit 70 maps the network service to "Nth" fallback transport tunnel 46N (514) and forwards the network traffic associated with the network service via the mapped transport tunnel (518).

In response to determining that the network service cannot be mapped to the "Nth" fallback mapping mode (e.g., "NO" block of 512), control unit 70 may determine that a destination of the network traffic associated with the network service is unreachable from network device 50. In some examples, control unit 70 may output an indication that the destination of the network traffic associated with the network service is unreachable from network device 50 (516).

In some examples, each of the at least one fallback mapping modes may be categorized according to types other than the type of the primary mapping mode. For example, the primary mapping mode may be categorized according to a first type, e.g., tunnel colorization, while the at least one fallback mapping modes are categorized according to a second type other than tunnel colorization. With respect to the example of FIG. 5, the network service associated with the network traffic corresponds to a "red" service color. The primary mapping mode of tunnel selection scheme 86 may designate tunnel 42A as the primary transport tunnel, where tunnel 42A is assigned, e.g., a tunnel color of "red." In contrast to the primary mapping mode categorized by tunnel colorization, the first fallback mapping mode may be categorized according to IGP route, the second fallback mapping mode may be categorized according to IP tunnel endpoint address, and the "Nth" fallback mapping mode may be categorized according to an IPv6 conversion of an IPv4 endpoint address prefix of the tunnel. For example, regardless of whether the at least one fallback transport tunnel is assigned a tunnel color that corresponds to a service color of the network service, is assigned a tunnel color that does not correspond to the service color of the network service, or is uncolored (e.g., not assigned any tunnel color), control unit 70 may map the network service to the at least one fallback transport tunnel based on, e.g., the at least one fallback transport tunnel corresponding to an IGP route to a destination of the network traffic associated with the network service, etc.

The following examples may illustrate one or more aspects of the disclosure.

Example 1. A method comprising: obtaining, by processing circuitry of a network device and based on one or more service parameters associated with a network service, a service-specific tunnel selection scheme that identifies: a primary mapping mode for mapping the network service to a primary transport tunnel of a plurality of transport tunnels having one or more tunnel parameters; and at least one fallback mapping mode for mapping the network service to at least one fallback transport tunnel of the plurality of transport tunnels; determining, by the processing circuitry, that the network service cannot be mapped to the primary transport tunnel according to the primary mapping mode identified by the service-specific tunnel selection scheme; in response to determining that the network service cannot be mapped to the primary transport tunnel according to the primary mapping mode, mapping, by the processing circuitry and based on the at least one fallback mapping mode identified by the service-specific tunnel selection scheme, the network service to the at least one fallback transport tunnel; and forwarding, by the processing circuitry, network traffic associated with the network service via the at least one fallback transport tunnel.

Example 2. The method of example 1, wherein the one or more service parameters associated with the network service comprise a service color associated with the network service.

Example 3. The method of any of examples 1 through 2, wherein the one or more service parameters associated with the network service comprise a service type of the network service.

Example 4. The method of any of examples 1 through 3, wherein the one or more service parameters associated with the network service comprise a service color associated with the network service; wherein the one or more tunnel parameters of the primary transport tunnel comprise a tunnel color, and wherein the tunnel color of the primary transport tunnel is the same as the service color associated with the network service.

Example 5. The method of any of examples 1 through 4, wherein the primary mapping mode is categorized according to a first type, the first type comprising tunnel coloration, and wherein the at least one fallback mapping mode is categorized according to a second type other than tunnel coloration.

Example 6. The method of example 5, wherein the second type other than tunnel coloration comprises Interior Gateway Protocol (IGP), and wherein the at least one fallback transport tunnel corresponds to an IGP route to a destination of the network traffic associated with the network service.

Example 7. The method of example 5, wherein the second type other than tunnel coloration comprises Internet Protocol (IP) address, and wherein the at least one fallback transport tunnel comprises an IP endpoint address of a destination of the network traffic associated with the network service, wherein the IP endpoint address comprises at least one of an IP address prefix or a host identifier.

Example 8. The method of example 5, wherein the second type other than tunnel coloration comprises an Internet Protocol version 6 (IPv6) conversion of an Internet Protocol version 4 (IPv4) endpoint address, and wherein the at least one fallback transport tunnel comprises an IPv6 conversion of an IPv4 endpoint address of a destination of the network traffic associated with the network service, and wherein the IPv4 endpoint address comprises at least one of an IPv4 address prefix or an IPv4 host identifier.

Example 9. The method of example 5, wherein the at least one fallback mapping mode for mapping the network service to at least one fallback transport tunnel of the plurality of transport tunnels comprises a first fallback mapping mode for mapping the network service to a first fallback transport tunnel of the plurality of transport tunnels and a second fallback mapping mode for mapping the network service to a second fallback transport tunnel of the plurality of transport tunnels, wherein the first fallback mapping mode is categorized according to the second type other than tunnel coloration and the second fallback mapping mode is categorized according to a third type other than tunnel coloration and different from the first type, wherein mapping, based on the at least one fallback mapping mode identified by the service-specific tunnel selection scheme, the network service to the at least one fallback transport tunnel comprises: determining that the network service cannot be mapped to the first fallback transport tunnel according to the first fallback mapping mode identified by the service-specific tunnel selection scheme; and in response to determining that the network service cannot be mapped to the first fallback transport tunnel according to the first fallback mapping mode, mapping, by the processing circuitry and based on the second fallback mapping mode identified by the service-specific tunnel selection scheme, the network service to the second fallback transport tunnel, and wherein forwarding the network traffic associated with the network service via the at least one fallback transport tunnel comprises forwarding the network traffic associated with the network service via the second fallback transport tunnel.

Example 10. The method of example 9, wherein the one or more service parameters associated with the network service comprise a service color associated with the network service, wherein one or more tunnel parameters of the primary transport tunnel comprise a tunnel color that is the same as the service color associated with the network service, wherein the second type comprises an Interior Gateway Protocol (IGP), the first fallback tunnel corresponding to an IGP route to a destination of the network traffic associated with the network service, wherein the third type comprises Internet Protocol (IP) address, the second fallback tunnel corresponding to an IP endpoint address of the destination of the network traffic associated with the network service, wherein the IP endpoint address comprises at least one of an IP address prefix or a host identifier.

Example 11. The method of any of examples 1 through 10, wherein obtaining, based on the one or more service parameters associated with the network service, the service-specific tunnel selection scheme comprises receiving, by the processing circuitry, an exterior gateway protocol message specifying the tunnel selection scheme.

Example 12. The method of example 11, wherein the exterior gateway protocol message comprises a Border Gateway Protocol (BGP) UPDATE extended community message.

Example 13. The method of any of examples 11 through 12, further comprising receiving, by the processing circuitry, the network traffic associated with the network service, wherein the exterior gateway protocol message comprises a payload prefix specifying the one or more service parameters associated with the network service.

Example 14. A network device comprising processing circuitry operably coupled to a storage medium, the processing circuitry configured to: obtain, based on one or more service parameters associated with a network service, a service-specific tunnel selection scheme that identifies: a primary mapping mode for mapping the network service to a primary transport tunnel of a plurality of transport tunnels having one or more tunnel parameters; and at least one fallback mapping mode for mapping the network service to at least one fallback transport tunnel of the plurality of transport tunnels; determine that the network service cannot be mapped to the primary transport tunnel according to the primary mapping mode identified by the service-specific tunnel selection scheme; in response to determining that the network service cannot be mapped to the primary transport tunnel according to the primary mapping mode, map, based on the at least one fallback mapping mode identified by the service-specific tunnel selection scheme, the network service to the at least one fallback transport tunnel; and forward network traffic associated with the network service via the at least one fallback transport tunnel.

Example 15. The network device of example 14, wherein the one or more service parameters associated with the network service comprise a service color associated with the network service.

Example 16. The network device of any of examples 14 through 15, wherein the one or more service parameters associated with the network service comprise a service type of the network service.

Example 17. The network device of any of examples 14 through 16, wherein the one or more service parameters associated with the network service comprise a service color associated with the network service; wherein the one or more tunnel parameters of the primary transport tunnel comprise a tunnel color, and wherein the tunnel color of the primary transport tunnel is the same as the service color associated with the network service.

Example 18. The network device of any of examples 14 through 17, wherein the primary mapping mode is categorized according to a first type, the first type comprising tunnel coloration, and wherein the at least one fallback mapping mode is categorized according to a second type other than tunnel coloration.

Example 19. The network device of example 18, wherein the second type other than tunnel coloration comprises an Internet Protocol version 6 (IPv6) conversion of an Internet Protocol version 4 (IPv4) endpoint address, and wherein the at least one fallback transport tunnel comprises an IPv6 conversion of an IPv4 endpoint address of a destination of the network traffic associated with the network service, and wherein the IPv4 endpoint address comprises at least one of an IPv4 address prefix or an IPv4 host identifier.

Example 20. A non-transitory, computer-readable medium comprising instructions that, when executed, are configured to cause processing circuitry of a network device to: obtain, based on one or more service parameters associated with a network service, a service-specific tunnel selection scheme that identifies: a primary mapping mode for mapping the network service to a primary transport tunnel of a plurality of transport tunnels having one or more tunnel parameters; and at least one fallback mapping mode for mapping the network service to at least one fallback transport tunnel of the plurality of transport tunnels; determine that the network service cannot be mapped to the primary transport tunnel according to the primary mapping mode identified by the service-specific tunnel selection scheme; in response to determining that the network service cannot be mapped to the primary transport tunnel according to the primary mapping mode, map, based on the at least one fallback mapping mode identified by the service-specific tunnel selection scheme, the network service to the at least one fallback transport tunnel; and forward network traffic associated with the network service via the at least one fallback transport tunnel.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:

receiving, by processing circuitry of a network device and via an exterior gateway protocol, one or more service-specific tunnel selection schemes;

obtaining, by the processing circuitry and based on one or more service parameters associated with a network service, a service-specific tunnel selection scheme of the one or more service-specific tunnel selection schemes, the service-specific tunnel selection scheme identifying:

a primary mapping mode for mapping the network service to a primary transport tunnel of a plurality of transport tunnels having one or more tunnel parameters, wherein the primary mapping mode is categorized according to a first type, the first type comprising tunnel coloration; and at least one fallback mapping mode for mapping the network service to at least one fallback transport tunnel of the plurality of transport tunnels, wherein the at least one fallback mapping mode is categorized according to a second type other than tunnel coloration;

determining, by the processing circuitry, that the network service cannot be mapped to the primary transport tunnel according to the primary mapping mode identified by the service-specific tunnel selection scheme;

in response to determining that the network service cannot be mapped to the primary transport tunnel according to the primary mapping mode, mapping, by the processing circuitry and based on the at least one fallback mapping mode identified by the service-specific tunnel selection scheme, the network service to the at least one fallback transport tunnel; and forwarding, by the processing circuitry, network traffic associated with the network service via the at least one fallback transport tunnel.

2. The method of claim 1, wherein the one or more service parameters associated with the network service comprise a service color associated with the network service.

3. The method of claim 1, wherein the one or more service parameters associated with the network service comprise a service type of the network service.

4. The method of claim 1, wherein the one or more service parameters associated with the network service comprise a service color associated with the network service;

wherein the one or more tunnel parameters of the primary transport tunnel comprise a tunnel color, and wherein the tunnel color of the primary transport tunnel is the same as the service color associated with the network service.

5. The method of claim 1, wherein the second type other than tunnel coloration comprises Interior Gateway Protocol (IGP), and wherein the at least one fallback transport tunnel corresponds to an IGP route to a destination of the network traffic associated with the network service.

6. The method of claim 1, wherein the second type other than tunnel coloration comprises Internet Protocol (IP) address, and wherein the at least one fallback transport tunnel comprises an IP endpoint address of a destination of the network traffic associated with the network service, wherein the IP endpoint address comprises at least one of an IP address prefix or a host identifier.

7. The method of claim 1, wherein the second type other than tunnel coloration comprises an Internet Protocol version 6 (IPv6) conversion of an Internet Protocol version 4 (IPv4) endpoint address, and wherein the at least one fallback transport tunnel comprises an IPv6 conversion of an IPv4 endpoint address of a destination of the network traffic associated with the network service, and wherein the IPv4 endpoint address comprises at least one of an IPv4 address prefix or an IPv4 host identifier.

8. The method of claim 1, wherein the at least one fallback mapping mode for mapping the network service to at least one fallback transport tunnel of the plurality of transport tunnels comprises a first fallback mapping mode for mapping the network service to a first fallback transport tunnel of the plurality of transport tunnels and a second fallback mapping mode for mapping the network service to a second fallback transport tunnel of the plurality of transport tunnels, wherein the first fallback mapping mode is categorized according to the second type other than tunnel coloration and the second fallback mapping mode is categorized according to a third type other than tunnel coloration and different from the first type, wherein mapping, based on the at least one fallback mapping mode identified by the service-specific tunnel selection scheme, the network service to the at least one fallback transport tunnel comprises:

determining that the network service cannot be mapped to the first fallback transport tunnel according to the first fallback mapping mode identified by the service-specific tunnel selection scheme; and in response to determining that the network service cannot be mapped to the first fallback transport tunnel according to the first fallback mapping mode, mapping, by the processing circuitry and based on the second fallback mapping mode identified by the service-specific tunnel selection scheme, the network service to the second fallback transport tunnel, and wherein forwarding the network traffic associated with the network service via the at least one fallback transport tunnel comprises forwarding the network traffic associated with the network service via the second fallback transport tunnel.

9. The method of claim 8, wherein the one or more service parameters associated with the network service comprise a service color associated with the network service, wherein one or more tunnel parameters of the primary transport tunnel comprise a tunnel color that is the same as the service color associated with the network service, wherein the second type comprises an Interior Gateway Protocol (IGP), the first fallback tunnel corresponding to an IGP route to a destination of the network traffic associated with the network service, wherein the third type comprises Internet Protocol (IP) address, the second fallback tunnel corresponding to an IP endpoint address of the destination of the network traffic associated with the network service, wherein the IP endpoint address comprises at least one of an IP address prefix or a host identifier.

10. The method of claim 1, wherein receiving the one or more service-specific tunnel selection schemes comprises receiving, by the processing circuitry, an exterior gateway protocol message specifying the service-specific tunnel selection scheme of the one more service specific tunnel selection schemes.

11. The method of claim 10, wherein the exterior gateway protocol message comprises a Border Gateway Protocol (BGP) UPDATE extended community message.

12. The method of claim 10, further comprising receiving, by the processing circuitry, the network traffic associated with the network service, wherein the exterior gateway protocol message comprises a payload prefix specifying the one or more service parameters associated with the network service.

13. A network device comprising processing circuitry operably coupled to a storage medium, the processing circuitry configured to:

receive, via an exterior gateway protocol, one or more service-specific tunnel selection schemes;

obtain, based on one or more service parameters associated with a network service, a service-specific tunnel selection scheme of the one or more service-specific tunnel selection schemes, the service-specific tunnel selection schemes identifying:

a primary mapping mode for mapping the network service to a primary transport tunnel of a plurality of transport tunnels having one or more tunnel parameters, wherein the primary mapping mode is categorized according to a first type, the first type comprising tunnel coloration; and at least one fallback mapping mode for mapping the network service to at least one fallback transport tunnel of the plurality of transport tunnels, wherein the at least one fallback mapping mode is categorized according to a second type other than tunnel coloration;

determine that the network service cannot be mapped to the primary transport tunnel according to the primary mapping mode identified by the service-specific tunnel selection scheme;

in response to determining that the network service cannot be mapped to the primary transport tunnel according to the primary mapping mode, map, based on the at least one fallback mapping mode identified by the service-specific tunnel selection scheme, the network service to the at least one fallback transport tunnel; and forward network traffic associated with the network service via the at least one fallback transport tunnel.

14. The network device of claim 13, wherein the one or more service parameters associated with the network service comprise a service color associated with the network service.

15. The network device of claim 13, wherein the one or more service parameters associated with the network service comprise a service type of the network service.

16. The network device of claim 13, wherein the one or more service parameters associated with the network service comprise a service color associated with the network service;

wherein the one or more tunnel parameters of the primary transport tunnel comprise a tunnel color, and wherein the tunnel color of the primary transport tunnel is the same as the service color associated with the network service.

17. The network device of claim 1, wherein the second type other than tunnel coloration comprises an Internet Protocol version 6 (IPv6) conversion of an Internet Protocol version 4 (IPv4) endpoint address, and wherein the at least one fallback transport tunnel comprises an IPv6 conversion of an IPv4 endpoint address of a destination of the network traffic associated with the network service, and wherein the IPv4 endpoint address comprises at least one of an IPv4 address prefix or an IPv4 host identifier.

18. A non-transitory, computer-readable medium comprising instructions that, when executed, are configured to cause processing circuitry of a network device to:

receive, via an exterior gateway protocol, one or more service-specific tunnel selection schemes;

obtain, based on one or more service parameters associated with a network service, a service-specific tunnel selection scheme of the one or more service-specific tunnel selection schemes, the service-specific tunnel selection scheme identifying:

a primary mapping mode for mapping the network service to a primary transport tunnel of a plurality of transport tunnels having one or more tunnel parameters, wherein the primary mapping mode is categorized according to a first type, the first type comprising tunnel coloration; and at least one fallback mapping mode for mapping the network service to at least one fallback transport tunnel of the plurality of transport tunnels, wherein the at least one fallback mapping mode is categorized according to a second type other than tunnel coloration;

determine that the network service cannot be mapped to the primary transport tunnel according to the primary mapping mode identified by the service-specific tunnel selection scheme;

in response to determining that the network service cannot be mapped to the primary transport tunnel according to the primary mapping mode, map, based on the at least one fallback mapping mode identified by the service-specific tunnel selection scheme, the network service to the at least one fallback transport tunnel; and forward network traffic associated with the network service via the at least one fallback transport tunnel.

* * * * *